US011138351B2

(12) United States Patent
Kuwahara

(10) Patent No.: US 11,138,351 B2
(45) Date of Patent: Oct. 5, 2021

(54) ESTIMATED DISTANCE CALCULATOR, ESTIMATED DISTANCE CALCULATION METHOD, ESTIMATED DISTANCE CALCULATION PROGRAM, AND AUTOMATED PLANNER

(71) Applicant: NEC Corporation, Tokyo (JP)

(72) Inventor: Takuya Kuwahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 286 days.

(21) Appl. No.: 16/318,401

(22) PCT Filed: Jun. 30, 2017

(86) PCT No.: PCT/JP2017/024230
§ 371 (c)(1),
(2) Date: Jan. 17, 2019

(87) PCT Pub. No.: WO2018/016299
PCT Pub. Date: Jan. 25, 2018

(65) Prior Publication Data
US 2019/0236226 A1 Aug. 1, 2019

(30) Foreign Application Priority Data

Jul. 21, 2016 (JP) .............................. JP2016-143311
Nov. 16, 2016 (JP) .............................. JP2016-223322

(51) Int. Cl.
*G06F 30/23* (2020.01)
*G16Z 99/00* (2019.01)
*G01C 15/00* (2006.01)

(52) U.S. Cl.
CPC ............. *G06F 30/23* (2020.01); *G01C 15/00* (2013.01); *G16Z 99/00* (2019.02)

(58) Field of Classification Search
CPC .......... G06F 30/23; G16Z 99/00; G01C 15/00
See application file for complete search history.

(56) References Cited

U.S. PATENT DOCUMENTS

2014/0074538 A1\* 3/2014 Hama .................... B66C 23/58
705/7.23
2015/0324211 A1\* 11/2015 Kuroda .................. G05B 15/02
713/100

FOREIGN PATENT DOCUMENTS

JP 2014-55037 A 3/2014
JP 2015-215885 A 12/2015

OTHER PUBLICATIONS

International Search Report, issued by International Searching Authority in corresponding International Application No. PCT/JP2017/024230, dated Sep. 12, 2017.
(Continued)

*Primary Examiner* — Alexander Satanovsky
*Assistant Examiner* — Lyudmila Zaykova-Feldman
(74) *Attorney, Agent, or Firm* — Sughrue Mion, PLLC

(57) ABSTRACT

An estimated distance calculator 10 generates, on the basis of a first state element model comprising multiple state elements, a second state element model which is another state element model, wherein the state elements include multiple states and state transitions assigned with transition conditions between the multiple states. The calculator includes a generation unit 11 which generates the second state element model in such a manner as to comprise any one state element among the multiple state elements and state elements other than the one state element which are selected from among the multiple state elements after transition conditions satisfying predetermined condition are removed.

14 Claims, 36 Drawing Sheets

(56) References Cited

OTHER PUBLICATIONS

Written Opinion issued by the International Bureau in corresponding International Application No. PCT/JP2017/024230, dated Sep. 12, 2017.
Hart, et al., "A Formal Basis for the Heuristic Determination of Minimum Cost Paths," IEEE Transactions on Systems Science and Cybernetics, Jul. 1968, pp. 100-107, vol. ssc-4, No. 2 (8 pages total).
Kojima, et al., "A Method to Reduce State Transition Diagram for Conformance Test of MANET Protocols", The Transactions of the Institute of Electronics, Information and Communication Engineers (J91-B), Apr. 1, 2008, pp. 353-363, vol. J91-B, No. 4 (13 pages total).

\* cited by examiner

FIG. 28
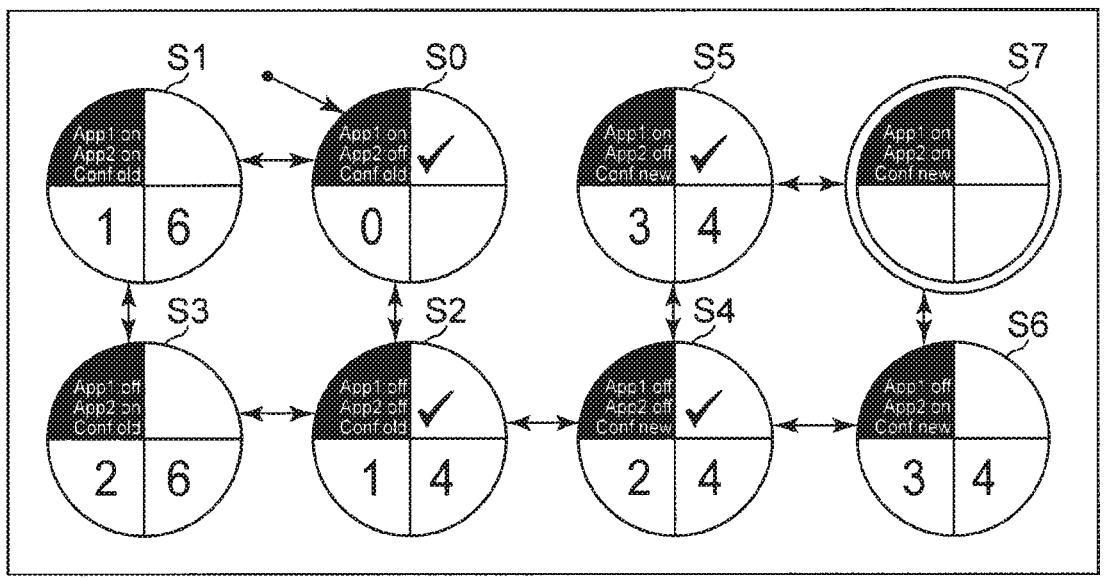
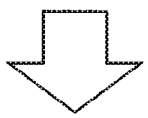
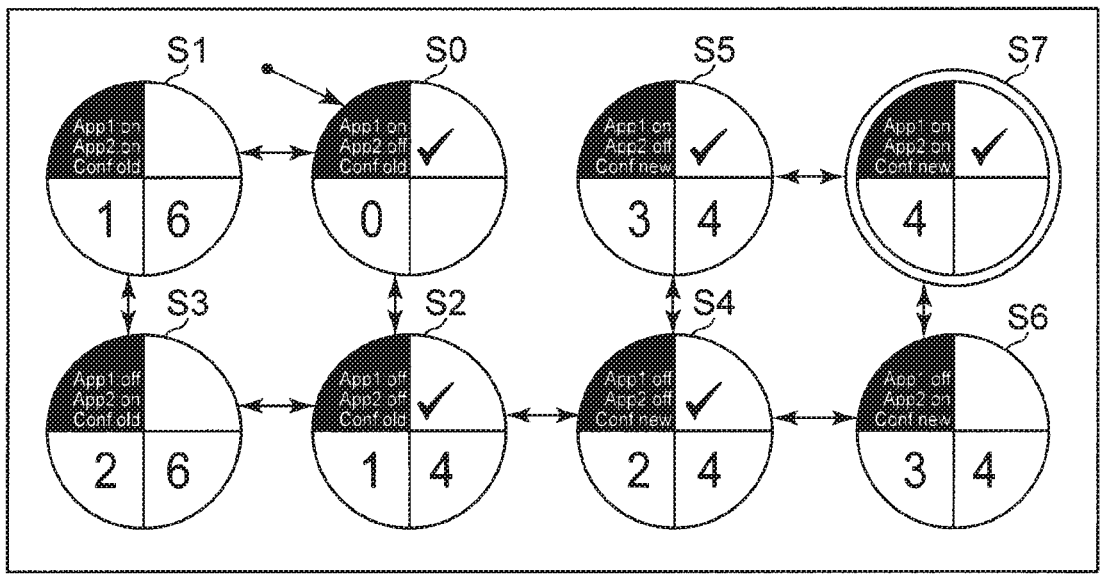

FIG. 34
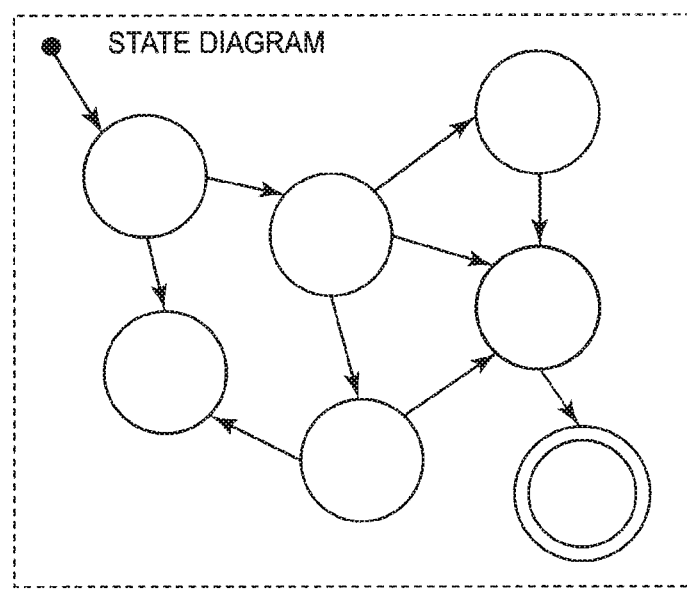
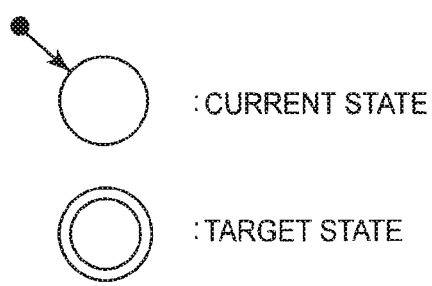
: CURRENT STATE
: TARGET STATE

INITIAL STATE    TARGET STATE

ESTIMATED DISTANCE CALCULATOR, ESTIMATED DISTANCE CALCULATION METHOD, ESTIMATED DISTANCE CALCULATION PROGRAM, AND AUTOMATED PLANNER

This application is a National Stage Entry of PCT/JP2017/024230 filed on Jun. 30, 2017, which claims priority from Japanese Patent Application 2016-143311 filed on Jul. 21, 2016 and Japanese Patent Application 2016-223322 filed on Nov. 16, 2016, the contents of all of which are incorporated herein by reference, in their entirety.

TECHNICAL FIELD

The present invention relates to an estimated distance calculator, an estimated distance calculation method, an estimated distance calculation program, and an automated planner, more particularly to an estimated distance calculator, an estimated distance calculation method, an estimated distance calculation program, and an automated planner for use in solving automated planning problems to allow an autonomous control system including artificial intelligence to decide a procedure for executing actions and tasks.

BACKGROUND ART

The automated planning is an art of scheduling actions, for example, action to be taken next, using artificial intelligence based on known environmental information. Among the known automated planning methods is a method of solving a shortest path problem, i.e., searching and finding a shortest path on a diagram representing the transition relationship of one state to another. The shortest path problem may be hereinafter referred to as automated planning problem.

FIG. 34 is an explanatory diagram showing an example of a state diagram. This state diagram shows a relationship among transitions between states.

Circles showed in FIG. 34 each represent a state. As showed in FIG. 34, one of the circles represents a current state, and the other circle represents a target state. In FIG. 34, arrows drawn between the circles each represent a transition relationship of one state to another. The state diagram of FIG. 34 indicates that the state transitions indicated with the arrows are possible.

Notations of the current state and target state may be similarly drawn in any other drawings.

The shortest path problem solving method defines a current state and a target state in a state diagram, like the one showed in FIG. 34, searches possible routes of transition of the current state to the target state along the arrows, and calculates and obtains, among the searched routes, a route representing the shortest procedure to arrive at the target state.

PTL 1 describes how to output a system updating procedure using the automated planning. Specifically, PTL 1 describes an automated planning problem solving method. In this method, calculating the shortest procedure of updating one large system including a plurality of small state transition systems that depend on other state transition systems is defined as calculating the shortest path on a state diagram to consequently solve the automated planning problem.

NPL 1 describes A* search which is one of solutions to the shortest path problem. In the A* search, states on the state diagram are marked with scores in search of the shortest path on the diagram while tracing the states.

The scores given to the states in the A* search are values calculated from ["distance from current state to search state"+"estimated distance from search state to target state"]. The A* search marks the states with scores and defines the states with lower scores to be nearer to the target state, based on which the lower-scored states are searched with higher priority.

FIG. 35 is an explanatory diagram showing a specific example of the A* search of a shortest path. As showed in FIG. 35, states painted in black are search states. Hatched states have already been searched. States with numbers are states with scores.

FIG. 35 show search results in different stages of the shortest path search by the A* search (hereinafter, search phases). In the A* search, the search state is initially as the current state, as showed in upper left of FIG. 35. Then, the A* search calculates the scores of all of the states adjacent to the search state.

After the scores are calculated, the A* search causes transition of the search state to a state with the lowest score among all of the states yet to be searched whose scores are already known (unsearched state). The A* search repeatedly carries out these steps until the search state finally arrives at the target state in order to obtain the shortest path.

The unsearched states with scores already known in the search phase of upper right of FIG. 35 have scores of 3, 4, 4, and ∞. The A* search causes transition of the search state to an unsearched state with the lowest score "3". The lower left of FIG. 35 shows a search result in a next phase to the search phase of upper right of FIG. 35 subsequent to the search state transition. The lower right of FIG. 35 shows a search result in the final search phase.

The description of the examples showed in FIG. 35, however, fails to clearly identify any specific method of calculating "an estimated distance from the search state to the target state". When a method currently employed to calculate the estimated distance is changed, how to proceed with search may accordingly change.

A function for estimation of a distance to a target state is referred to as heuristic function. It is a known matter that an estimated distance must be always less than a true distance in order to obtain a correct shortest path using the A* search. It is also a known matter that an estimated distance is preferably as closer to a true distance as possible for a higher search speed in the A* search.

The A* search, without relying on the heuristic function, may always set the estimated distance to "0" to search the shortest path. The A* search always using the estimated distance set to "0" may be performed similarly to the search method called "Dijkstra's algorithm".

A known method of formulating a good heuristic function is to build a relaxed problem(s). PTL 2 describes an exemplified art of using a heuristic function built by formulating the relaxed problem. Specifically, PTL 2 describes a method of dividing a loading problem; a task of reloading multiple items, into a few relaxed problems.

CITATION LIST

Patent Literature

PTL 1: US Patent Application Publication No. 2015/0324211
PTL 2: Japanese Patent Application Laid-Open No. 2014-055037

Non Patent Literature

NPL 1: Peter E. Hart, Nils J. Nilsson, and Bertram Raphael, "A Formal Basis for the Heuristic Determination of Minimal Cost Paths," in IEEE Transactions on Systems Science and Cybernetics, vol. 4, no. 2, pp. 100-107, July 1968.

SUMMARY OF INVENTION

Technical Problem

First, an automated planning problem, which is assumed to be processed by the present invention, is hereinafter described to address the technical issues.

The automated planning problem to be processed by the present invention is a planning problem similar to the automated planning problem described in PTL 1 and is aimed at obtaining a shortest path on a model where state diagrams are arranged. In the description given below, a state element model refers to a model where state diagrams are arranged, and a state element refers to a state diagram constituting the state element model.

A specific example of the automated planning problem is described below. FIG. 36 is an explanatory diagram showing initial states and target states of a crane and a load. The initial state showed in FIG. 36 indicates that the crane and the load are both at a location A. The target state showed in FIG. 36 indicates that the crane is currently at the location A, and the load at a location B.

An automated planning problem is generated in order to obtain a shortest procedure for transition of the initial state to the target state as showed in FIG. 36. FIG. 37 is an explanatory diagram showing an example of a state element model. The state element model showed in FIG. 37 is presented by the generated automated planning problem.

A state element "item" and a state element "crane" are arranged on the state element model showed in FIG. 37. The state element "item" is the state element of the load showed in FIG. 36. The state element "crane" is the state element of the crane showed in FIG. 36.

The state element "item" showed in FIG. 37 includes a state A, a state "picked", and a state B. The state A indicates that the load is currently at the location A. The state "picked" indicates that the load is held by the crane. The state B indicates that the load is currently at the location B.

The state element "crane" showed in FIG. 37 includes a state A and a state B. The state A indicates that the crane is currently at the location A. The state B indicates that the crane is currently at the location B.

In the state element "item" in FIG. 37, the state A is set as the current state, and the state B is set as the target state on the basis of FIG. 36. In the state element "crane" in FIG. 37, the state A is set as the current state and the target state both.

In the state element model are also described details of interference between the state elements. In FIG. 37, balloons painted in black with arrows indicative of state transitions show details of interference between the state elements (hereinafter, referred to as dependency).

As showed in FIG. 37, the balloons each contain the name of the other state element and a set of states included in the state element indicated by the name. Each balloon indicates that state transition with the balloon is left undone unless the state element indicated by the name written in the balloon has any state included in the set of states.

For example, the dependency showed in FIG. 37, [crane: {A}], is associated with state transitions of the state element "item"; state A→state "picked", and state "picked" →state A. This means that neither of state transitions of the state element "item"; state A→state "picked", and state "picked" →state A, is not allowed unless the state A is the state of the state element "crane".

The automated planning problem that seeks a shortest path on the state element model showed in FIG. 37 is comparable to a problem that seeks a shortest procedure of carrying the load at the location A to the location B using the crane showed in FIG. 36. The automated planning problem that seeks a shortest path on the state element model is eventually a problem that seeks a shortest procedure for state transitions of all of the state elements to their target states.

FIG. 38 is a drawing that shows an example of changes of state elements of a crane and a load when the load currently at the location A is carried to the location B by the crane according to a shortest procedure. FIG. 38 is an explanatory diagram showing an example of changes in a state element model. In FIG. 38, search states painted in black represent states of the crane and the load in different stages.

As showed in the first dashed rectangle from the left of FIG. 38, the crane and the load at the location A in an initial stage are both in the state A. The load is then held by the crane in a stage that follows, at which state transition of the load to the state "picked" occurs, as showed in the second dashed rectangle from the left of FIG. 38. The crane holding the load then moves from the location A to the location B, and state transition of the crane to the state B occurs, as showed in the third dashed rectangle from the left of FIG. 38.

The crane that moved to the location B then releases the load, therefore, state transition of the load to the state B occurs, arriving at the target state, as showed in the fourth dashed rectangle from the left of FIG. 38. The crane that released the load then moves from the location B to the location A, therefore, state transition of the crane to the state A occurs, arriving at the target state, as showed in the fifth dashed rectangle from the left of FIG. 38. Thus, the solution to the automated planning problem is the procedure showed in a lower part of FIG. 38.

It is contemplated to calculate a shortest path on a state element model in which all of state elements arrive at their target states, as showed in FIG. 38. When the algorithm described in PTL 1 is used, the state element model showed in FIG. 37 is laid out in a state diagram showed in FIG. 39. The present invention defines this state diagram as "global state diagram". The present invention further defines states constituting the global state diagram as "global states".

FIG. 39 is an explanatory diagram showing an example of the global state diagram. In FIG. 39, similarly to states included in state elements, a global state with an arrow directed rightward is the current state, and a global state in a double-lined box is the target state.

The current state and target state in the global state diagram depend on combinations of the state elements. Specifically, the state of the state element model in which states of all of the state elements are the current state is the current state in the global state diagram (hereinafter, global current state). Specifically, the state of the state element model in which state transitions of all of the state elements to their target states are completed is the target state in the global state diagram (hereinafter, global target state).

The automated planning problem that seeks the shortest path on the state element model is comparable to a problem that seeks a shortest procedure for transition of the global state from the global current state to the global target state in the global state diagram into which the state element model has been converted. This means that the procedure showed in FIG. 38 is obtained by solving the problem that seeks the shortest path on the global state diagram showed in FIG. 39.

The method described in PTL 1 may succeed in solving the automated planning problem that seeks the shortest path on the state element model. Yet, there is an issue to be addressed with the method described in PTL 1, which is described below.

The issue that remains unsolved in the method described in PTL 1 is exponential increase of a state space in proportion to a greater number of state elements included in the state element model, which may exponentially increase calculation time required to solve the automated planning problem.

When a state element including "n" number of states is added to the state element model, for example, the number of global states constituting the global state diagram into the state element model has been converted is "n" times greater than before the state element is added.

When, for example, 10 new state elements including three states are added to the state element model, the number of global states constituting the global state diagram is $3^{10}$=59,049 times greater than before the state elements are added.

Supposing that calculation time required to search the shortest path is simply proportional to the number of global states constituting the global state diagram, additional 10 new state elements may result in approximately 59,049 times longer calculation time. Considering the prospect of future increase of state elements to be included in a state element model to, for example, 20, 30, or more, solving the automated planning problem using the known art alone strongly suggests the possibility of searches being unfinished within realistic time spans.

Unless any heuristic function suitable for the A* search is introduced, such a drastic increase of calculation time may be likely to occur in problems with use cases for which the automated planning problem may be considered relatively useful. A specific example of drastically increased calculation time is described referring to FIG. 40.

FIG. 40 is an explanatory diagram showing another example of the state element model. FIG. 40 shows a specific example of the state element model in which execution time for the shortest path searching process significantly increases when no heuristic function is used.

The state element model showed in FIG. 40 includes a state element "App1", a state element "App2", a state element "App3", and a state element "Conf". FIG. 40 shows a state element model representing a system including three applications and a configuration file shared among the applications.

The state elements "App1", "App2", and "App3" are state elements respectively corresponding to an application 1, an application 2, and an application 3. As showed in FIG. 40, each application is modeled into a state element including two states; state "on" indicative of "currently operating", and state "off" indicative of "currently suspended".

The state element "Conf" is a state element corresponding to the configuration file. As showed in FIG. 40, the configuration file is modeled into a state element including two states; state "old" indicative of "before updating", and state "new" indicative of "after updating".

Updating the configuration file in the example of FIG. 40 is discussed below. In case the configuration file is to be updated, the current state of the state element "Conf" is the state "old", and the target state is the state "new", as showed in FIG. 40. As for the state elements "App1" to "App3", their current and target states are both the state "on".

As showed in FIG. 40, dependency [App1:{off}, App2:{off}, App3{off}] is associated with state transition, state "old"→state "new", of the state element "Conf". The reason for that is, if the configuration file is updated while an applications is active, the application may fail to correctly read data. Therefore, state transition, state "old"→state "new", of the state element "Conf" corresponding to the configuration file does not occur unless all of the applications referring to the configuration file are inactive.

The global states including states of the state elements "App1" to "App3" are expressed as [("App1" state), ("App2" state), ("App3" state)]. When the A* search searches a shortest procedure of updating the configuration file in the global states without calculating their scores, the global states are searched in the order of [on, on, on], [on, on, off], [on, off, on], [off, on, on], [on, off, off], [off, on, off], [off, off, on], and [off, off, off].

The reason for that is, if scores are unused, the A* search may proceed with the global states near to the global current state. In order to obtain a shortest procedure for state transition of the state element "Conf" from the state "old" to the state "new", the A* search is required to search all of the global states present between the global current state and the most remote global target state [off, off, off].

In the case of an optionally increased number of applications as described earlier, the search of a shortest path between the current state and the most remote state may be requested. To calculate a shortest path on a state element model representing a system including "n" number of applications, for example, $2^n$ number of states, at most, may have to be searched to continue the search to all of the applications are turned off. This means that calculation time required for the shortest path search exponentially increases with a greater number of applications included in the system.

When the A* search is used to search a shortest path on a state element model including abundant state elements, therefore, a suitable heuristic function is importantly selected. Therefore, an apparatus for use in solving the automated planning problem is desirably obtained that enables high-speed search of a shortest path, even under such circumstances, by estimating a shortest distance to the target state using a suitable heuristic function on the basis of dependency between the state elements.

Purpose of Invention

To address the issues of the known art, the present invention provides an estimated distance calculator, an estimated distance calculation method, an estimated distance calculation program, and an automated planner that may successfully enable high-speed search of a shortest path on a state element model.

Solution to Problem

The present invention provides an estimated distance calculator that generates, on the basis of a first state element model comprising multiple state elements, a second state element model which is another state element model, wherein the state elements include multiple states and state transitions assigned with transition conditions between the multiple states. The estimated distance calculator includes a generation unit which generates the second state element model in such a manner as to comprise any one state element among the multiple state elements and state elements other than the one state element which are selected from among the multiple state elements after transition conditions satisfying predetermined condition are removed.

The present invention provides an estimated distance calculation method usable in an estimated distance calculator that generates, on the basis of a first state element model comprising multiple state elements, a second state element model which is another state element model, wherein the state elements include multiple states and state transitions assigned with transition conditions between the multiple states. The estimated distance calculation method includes generating the second state element model in such a manner as to comprise any one state element among the multiple state elements and state elements other than the one state element which are selected from among the multiple state elements after transition conditions satisfying predetermined condition are removed.

The present invention provides an estimated distance calculation program executable in a computer that generates, on the basis of a first state element model comprising multiple state elements, a second state element model which is another state element model, wherein the state elements include multiple states and state transitions assigned with transition conditions between the multiple states. The estimated distance calculation program prompts the computer to execute a processing step of generating the second state element model in such a manner as to comprise any one state element among the multiple state elements and state elements other than the one state element which are selected from among the multiple state elements after transition conditions satisfying predetermined condition are removed.

The present invention provides an automated planner that generates, on the basis of a first state element model comprising multiple state elements, a second state element model which is another state element model, wherein the state elements include multiple states and state transitions assigned with transition conditions between the multiple states. The automated planner includes a generator, an elicitor, and a searcher. The generator generates the second state element model in such a manner as to comprise any one state element among the multiple state elements and state elements other than the one state element which are selected from among the multiple state elements after transition conditions satisfying predetermined condition are removed. The elicitor receives, as input, the second state element model and that elicits, on the basis of a current state and a target state included in the second state element model, a smallest number of transitions for the current state to arrive at the target state. The searcher searches, using the smallest number of transitions, a shortest path which is a solution to an automated planning problem expressed by the first state element model.

Advantageous Effects of Invention

The present invention may enable a high-speed search of a shortest path on a state element model.

BRIEF DESCRIPTION OF DRAWINGS

FIG. 28 is an explanatory diagram showing a specific example of the shortest path searching process performed by the shortest path searching unit 202.

FIG. 34 is an explanatory diagram showing an example of a state diagram.

DESCRIPTION OF EXEMPLARY EMBODIMENTS

First Exemplary Embodiment

[Description of Structure]

Figure 1:
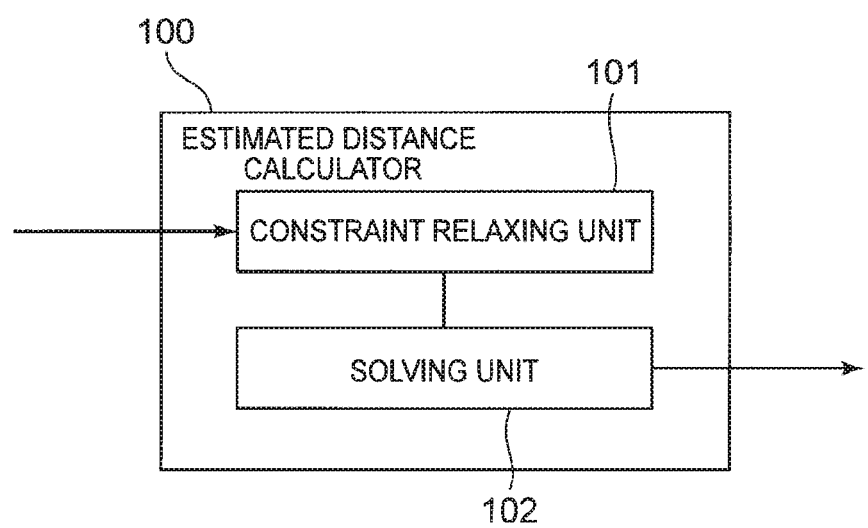
FIG. 1 is a block diagram showing a configuration example of a first exemplary embodiment of an estimated distance calculator 100 according to the present invention.

Exemplary embodiments of the present invention are hereinafter described referring to the accompanying drawings. FIG. 1 is a block diagram showing a configuration example of a first exemplary embodiment of an estimated distance calculator 100 according to the present invention.

The estimated distance calculator 100 showed in FIG. 1 receives, as input, an automated planning problem for search of a shortest path on a state element model. The estimated distance calculator 100 outputs an estimated distance of the shortest path from a current state to a target state on the state element model indicated by the automated planning problem.

The estimated distance calculator 100 according to this exemplary embodiment, using a method of estimating distances between different states by taking into account dependency constraints in the state element model, allows a shortest path searching device (not showed in the drawings) to perform a high-speed A* search on a global state diagram. The estimated distance calculator 100 according to this exemplary embodiment may quickly solve the automated planning problem that seeks the shortest path on the state element model.

As showed in FIG. 1, the estimated distance calculator 100 according to this exemplary embodiment has a constraint relaxing unit 101 and a solving unit 102.

The constraint relaxing unit 101 has a function to relax the inputted automated planning problem. The constraint relaxing unit 101 removes dependency included in any state element but one of a plurality of state elements constituting the state element model indicated by the automated planning problem and thereby relaxes the automated planning problem to generate a relaxed problem.

The constraint relaxing unit 101 inputs the generated relaxed problem to the solving unit 102. The solving unit 102 has a function to calculate solutions to the inputted relaxed problem. The solutions to the relaxed problem are to find a shortest path on the state element model indicated by the relaxed problem. The solving unit 102 outputs a most suitable one of the solutions to the relaxed problem as an estimated distance of the shortest path on the state element model indicated by the automated planning problem.

[Description of Operation]

Figure 2:
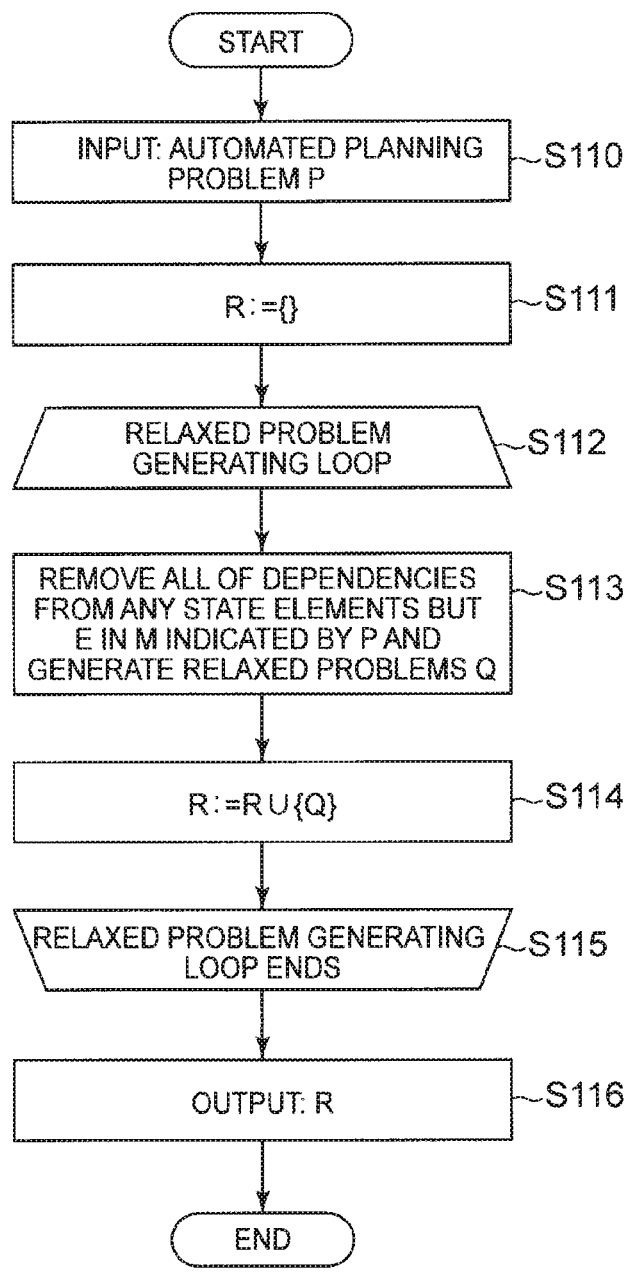
FIG. 2 is a flowchart showing an operation of a relaxed problem generating process performed by a constraint relaxing unit 101.
Figure 4:
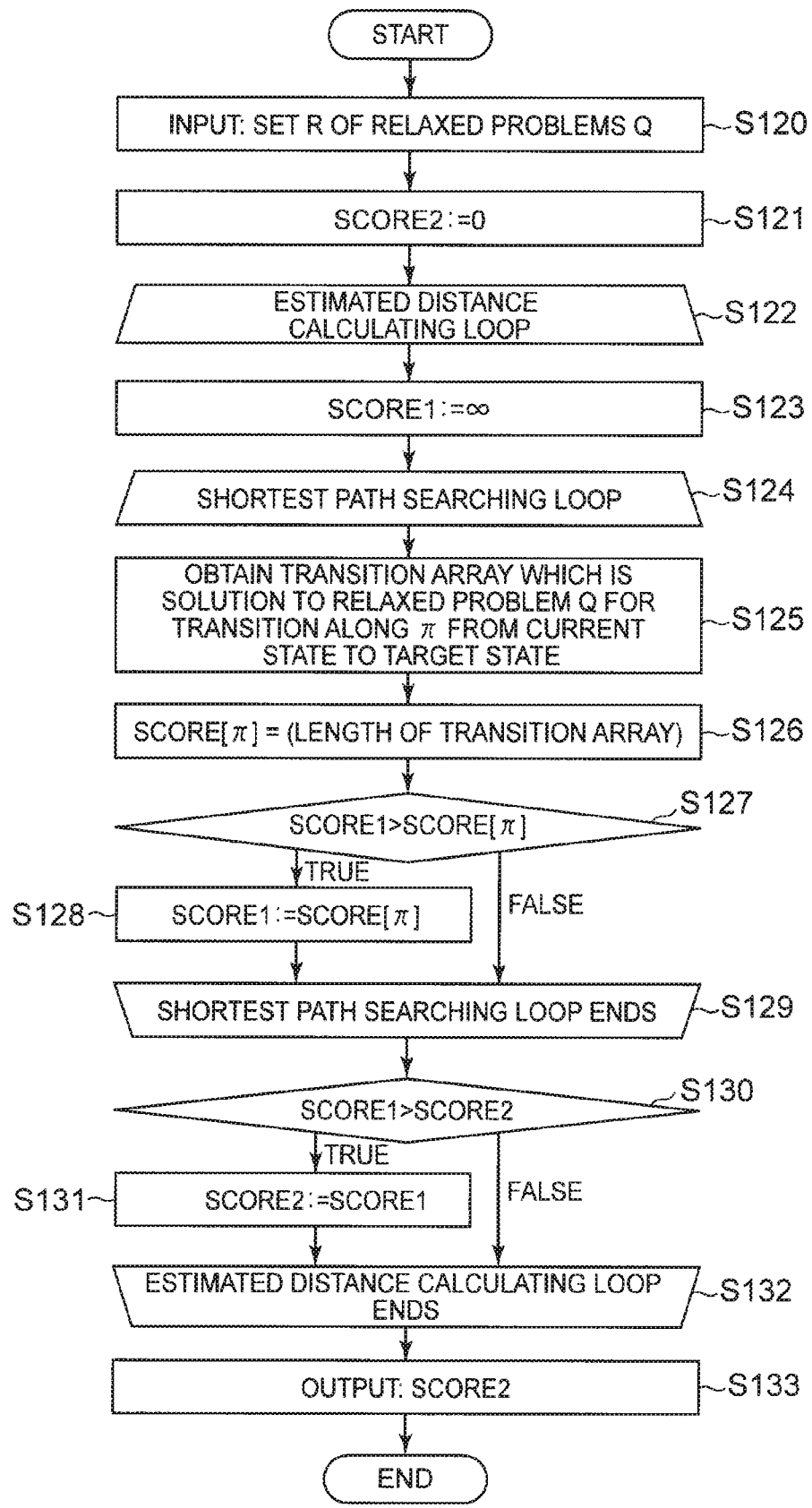
FIG. 4 is a flowchart showing an operation of an estimated distance calculating process performed by a solving unit 102.

The operation to output the estimated distance obtained by the estimated distance calculator 100 according to this exemplary embodiment is hereinafter described referring to FIGS. 2 and 4.

The description starts with a relaxed problem generating process performed by the constraint relaxing unit 101. FIG. 2 is a flowchart showing an operation of the relaxed problem generating process performed by the constraint relaxing unit 101.

After an automated planning problem P that seeks a shortest path on the state element model M is inputted to the estimated distance calculator 100, the automated planning problem P is inputted to the constraint relaxing unit 101 (step S110). Then, the constraint relaxing unit 101 defines a set R as void set (empty set) (step S111).

Next, the constraint relaxing unit 101 retrieves, out of the state elements included in the state element model M, a state element E for which any relaxed problem Q relevant to itself is yet to be generated. This means that the operation enters a relaxed problem generating loop (step S112).

The constraint relaxing unit 101 generates the relaxed problem Q relevant to the retrieved state element E (step S113). More specifically, the constraint relaxing unit 101 generates the relaxed problem Q relevant to the state element E by deleting, from dependencies included in the state element model M, all of dependencies but dependencies associated with state transitions involved with the state element E.

Next, the constraint relaxing unit 101 redefines the set R as a set to which the relaxed problem Q has been added (step S114). This means that the constraint relaxing unit 101 adds the relaxed problem Q generated in step S113 to the elements of the set R.

The constraint relaxing unit 101 repeatedly executes steps S113 and S114 for any state element E for which any relaxed problem Q relevant to itself is yet to be generated among the state elements included in the state element model M. Steps S113 and S114 are repeatedly performed for each and all of the state elements included in the state element model M.

After the relaxed problems Q relevant to all of the state elements included in the state element model M are generated, the constraint relaxing unit 101 exits the relaxed problem generating loop (step S115). The constraint relaxing unit 101 that exited the relaxed problem generating loop outputs the set R (step S116). After the output of the set R, the constraint relaxing unit 101 ends the relaxed problem generating process.

Figure 3:
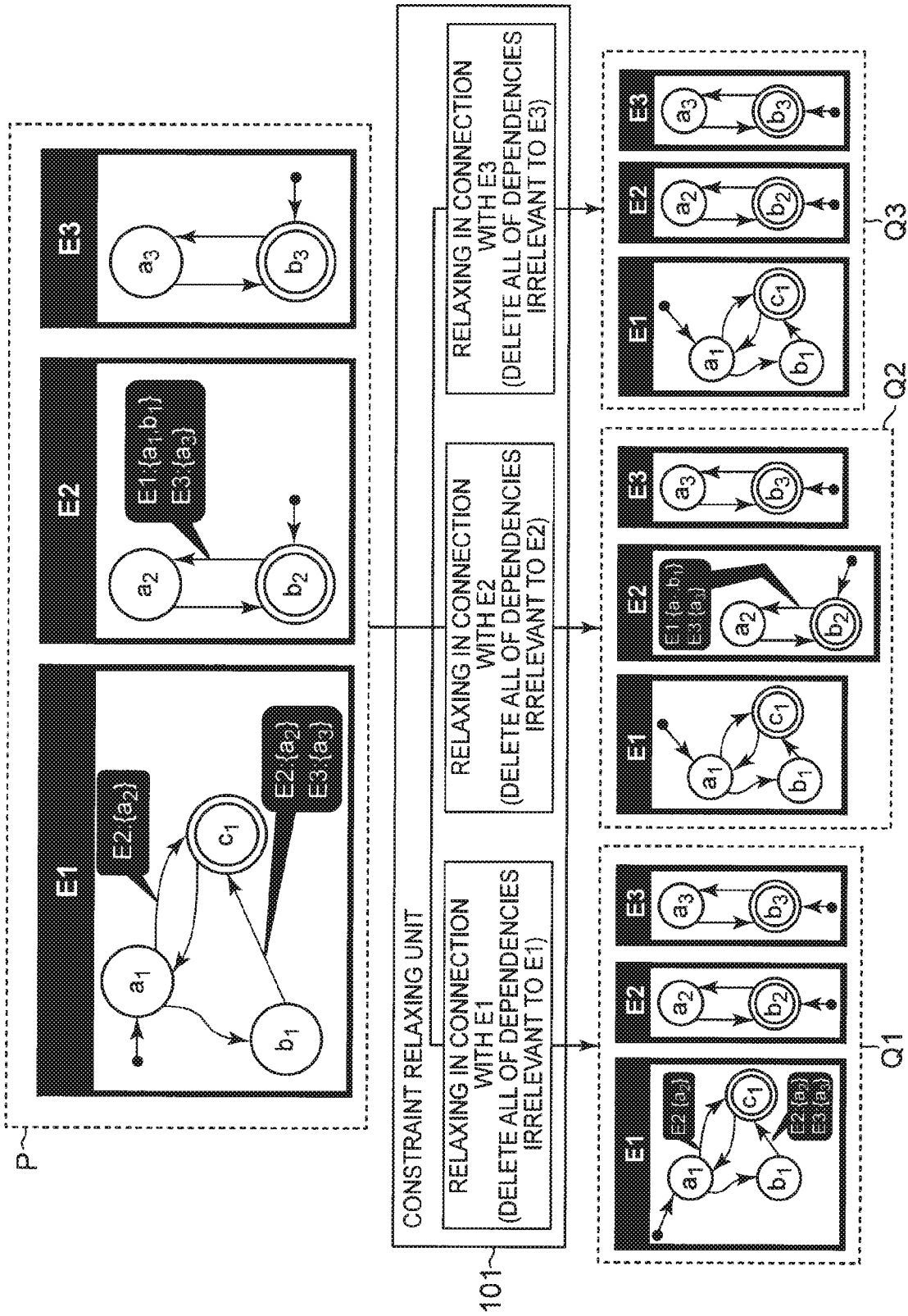
FIG. 3 is an explanatory diagram showing an example of the relaxed problem generating process performed by the constraint relaxing unit 101.

FIG. 3 is an explanatory diagram showing an example of the relaxed problem generating process performed by the constraint relaxing unit 101. The state element model M showed in FIG. 3 includes a state element E1, a state element E2, and a state element E3.

The constraint relaxing unit 101 uses the relaxed problem generating process to relax the automated planning problem P that seeks the shortest path on the state element model M. More specifically, the constraint relaxing unit 101, when relaxing the automated planning problem P in connection with the state element E1, generates a relaxed problem Q1 from which all of dependencies but dependencies associated with state transitions involved with the state element E1 have been deleted, as showed in FIG. 3.

Similarly, the constraint relaxing unit 101 generates relaxed problems Q2 and Q3 to relax the automated planning problem P in connection with the state elements E2 and E3. As showed in FIG. 3, when the automated planning problem P indicates the state element model M including three state elements, the constraint relaxing unit 101 generates three relaxed problems using the relaxed problem generating process.

Next, an estimated distance calculating process performed by the solving unit 102 is hereinafter described. FIG. 4 is a flowchart showing an operation of an estimated distance calculating process performed by a solving unit 102.

First, a set R of relaxed problems Q outputted by the constraint relaxing unit 101 is inputted to the solving unit 102 (step S120). Then, the solving unit 102 sets SCORE2 to 0 (step S121).

Then, the solving unit 102 retrieves the relaxed problem Q yet to be solved from the relaxed problems Q included in the set R. This means that the operation enters an estimated distance calculating loop (step S122).

The solving unit 102 solves the retrieved relaxed problem Q within the estimated distance calculating loop. In this description, $Q hereinafter refers to any state element still including dependency among the state elements included in the relaxed problem Q. Further, it hereinafter refers to a non-redundant path for state transition of the state element $Q from the current state to the target state.

On the other hand, "redundant path" may refer to a path in which transition of a search state to the same state occurs twice. For example, a path "$a_1 \rightarrow c_1 \rightarrow a_1 \rightarrow b_1 \rightarrow c_1$" is a redundant path involving two transitions of the search state to $a_1$ and to $c_1$.

First, the solving unit 102 sets SCORE1 to ∞ (step S123). Then, the solving unit 102 decides a path π whose transition array is yet to be obtained. This means that the operation enters a shortest path searching loop (step S124).

A state transition of the state element $Q included in the relaxed problem Q along the shortest path on the global state diagram may possibly be a transition along a certain non-redundant path π. In this exemplary embodiment, the solving unit 102 solves the relaxed problem Q, assuming that "state transition of the state element $Q occurs along the path π".

Figure 38:
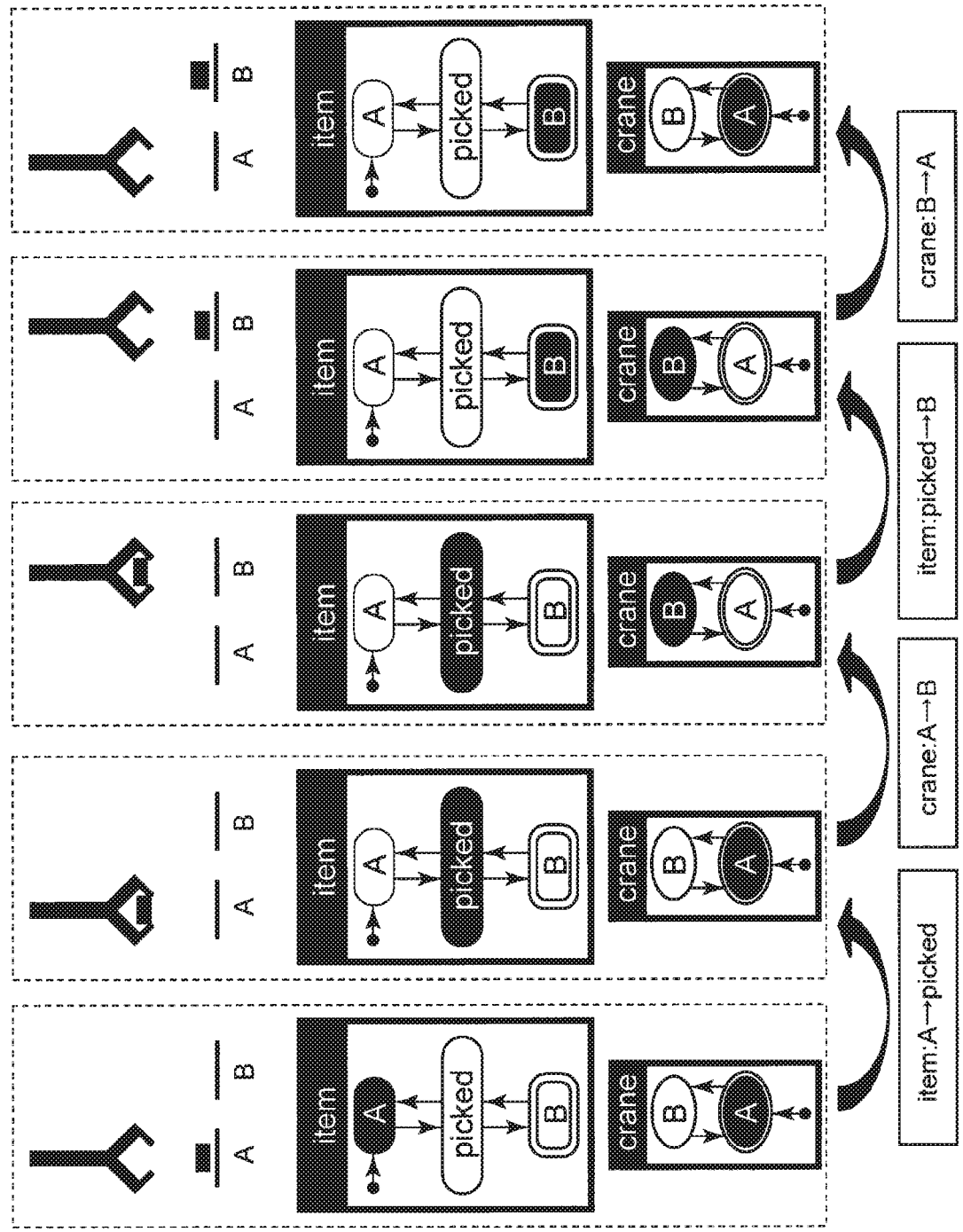
FIG. 38 is an explanatory diagram showing an example of changes in a state element model.
Figure 39:
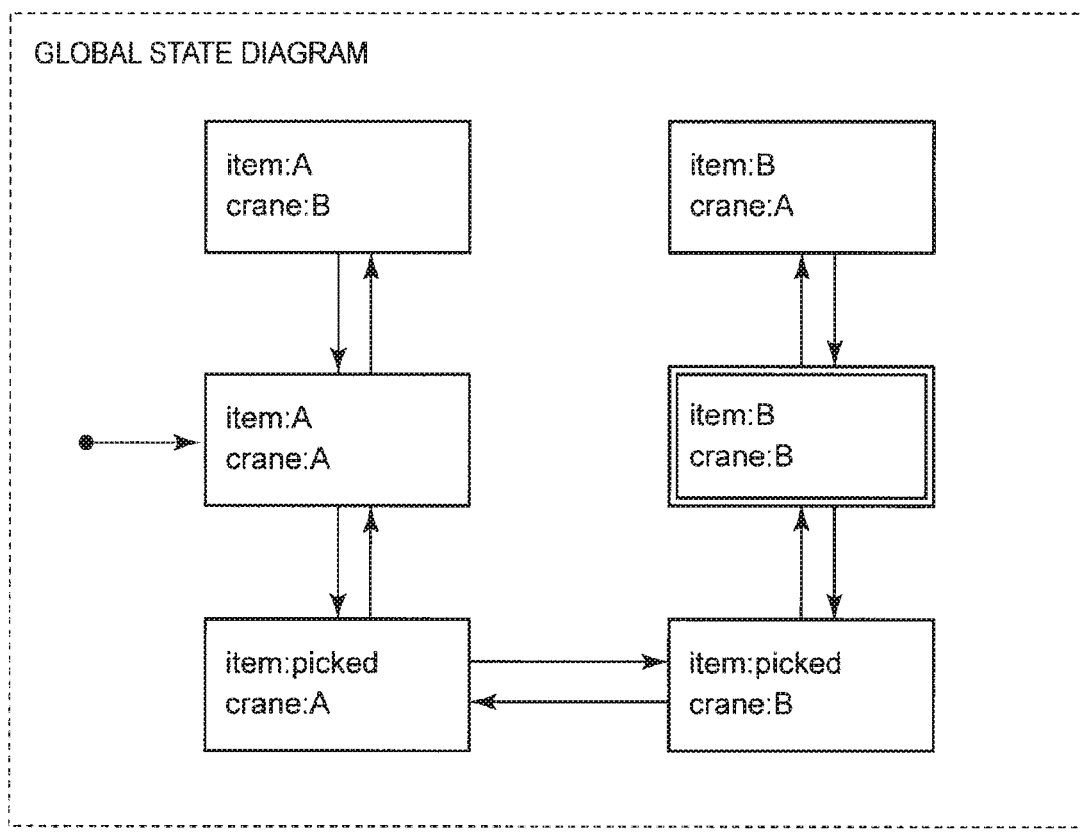
FIG. 39 is an explanatory diagram showing an example of a global state diagram.

Before the state element $Q presently in the current state finally arrives at the target state, there is more than one state transition. The solving unit 102 obtains, as the solution to the relaxed problem Q, a transition array of state transitions arranged in the order that they occurred by the time when the state element $Q in the current state arrives at the target state (step S125). An example of the transition array is the state transition array showed at the bottom of FIG. 38, "item: A→picked, crane: A→B, item: picked→B, crane: B→A".

Next, the solving unit 102 sets the length of the transition array obtained in step S125 to SCORE[π] (step S126). For instance, "4" is the length of a transition array including four state transitions.

Then, the solving unit 102 determines whether SCORE1 is greater than SCORE[π] (step S127). When SCORE1 is greater than SCORE[π] (True in step S127), the solving unit 102 sets SCORE[π] to SCORE1 (step S128).

The solving unit 102 repeatedly performs steps S125 to S128 for any path π for which a transition array relevant to the state element $Q is yet to be obtained. Steps S125 to S128 are repeatedly performed for each and all of the paths π assumed to be non-redundant in connection with the state element $Q.

After the transition arrays of all of the paths π relevant to the state element $Q are obtained, the solving unit 102 exits the shortest path searching loop (step S129). At the time of the solving unit 102 exiting the shortest path searching loop, the smallest value of lengths of the obtained transition arrays is stored in SCORE1. Specifically, SCORE1 at the time of the solving unit 102 exiting the shortest path searching loop is a distance as the solution to the relaxed problem Q (shortest path).

Then, the solving unit 102 determines whether SCORE1 is greater than SCORE2 (step S130). When SCORE1 is greater than SCORE2 (True in step S130), the solving unit 102 sets SCORE1 to SCORE2 (step S131).

The solving unit 102 repeatedly performs steps S123 to S131 for any relaxed problem Q included in the set R whose solution is yet to be found. Steps S123 to S131 are repeatedly performed for each and all of the relaxed problems Q included in the set R.

When the solutions to all of the relaxed problems Q included in the set R are finally obtained, the solving unit 102 exits the estimated distance calculating loop (step S132). At the time of the solving unit 102 exiting the estimated distance calculating loop, the largest value of distances in the solutions to the relaxed problems Q is stored in SCORE2. Specifically, SCORE2 at the time of the solving unit 102 exiting the estimated distance calculating loop is an estimated distance of the shortest path as the solution to the automated planning problem P.

The solving unit 102 that exited the estimated distance calculating loop outputs SCORE2 (step S133). After the output of SCORE2, the solving unit 102 ends the estimated distance calculating process.

Figure 5:
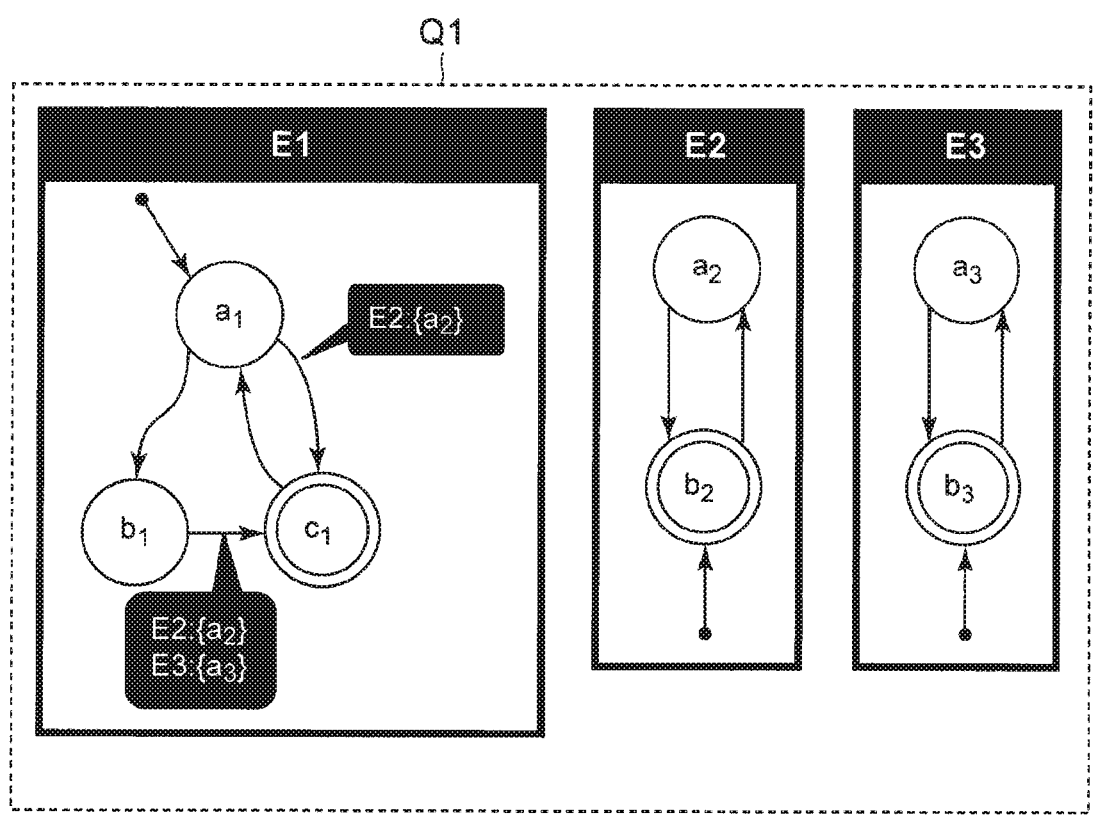
FIG. 5 is an explanatory diagram showing an example of relaxed problem generated by the constraint relaxing unit 101.

Next, a specific example of the estimated distance calculating process performed by the solving unit 102 is hereinafter described. FIG. 5 is an explanatory diagram showing an example of relaxed problem generated by the constraint relaxing unit 101. The relaxed problem showed in FIG. 5 is the relaxed problem Q1 generated in the relaxed problem generating process showed in FIG. 3.

The relaxed problem Q1 is generated by relaxing constraints on the automated planning problem P in connection with the state element E1. In the state element E1 included in the relaxed problem Q1, the current state is $a_1$, and the target state is $c_1$. For transition from the current state $a_1$ to the target state $c_1$, there are two non-redundant paths π, "$a_1 \rightarrow c_1$" and "$a_1 \rightarrow b_1 \rightarrow c_1$".

Figure 6:
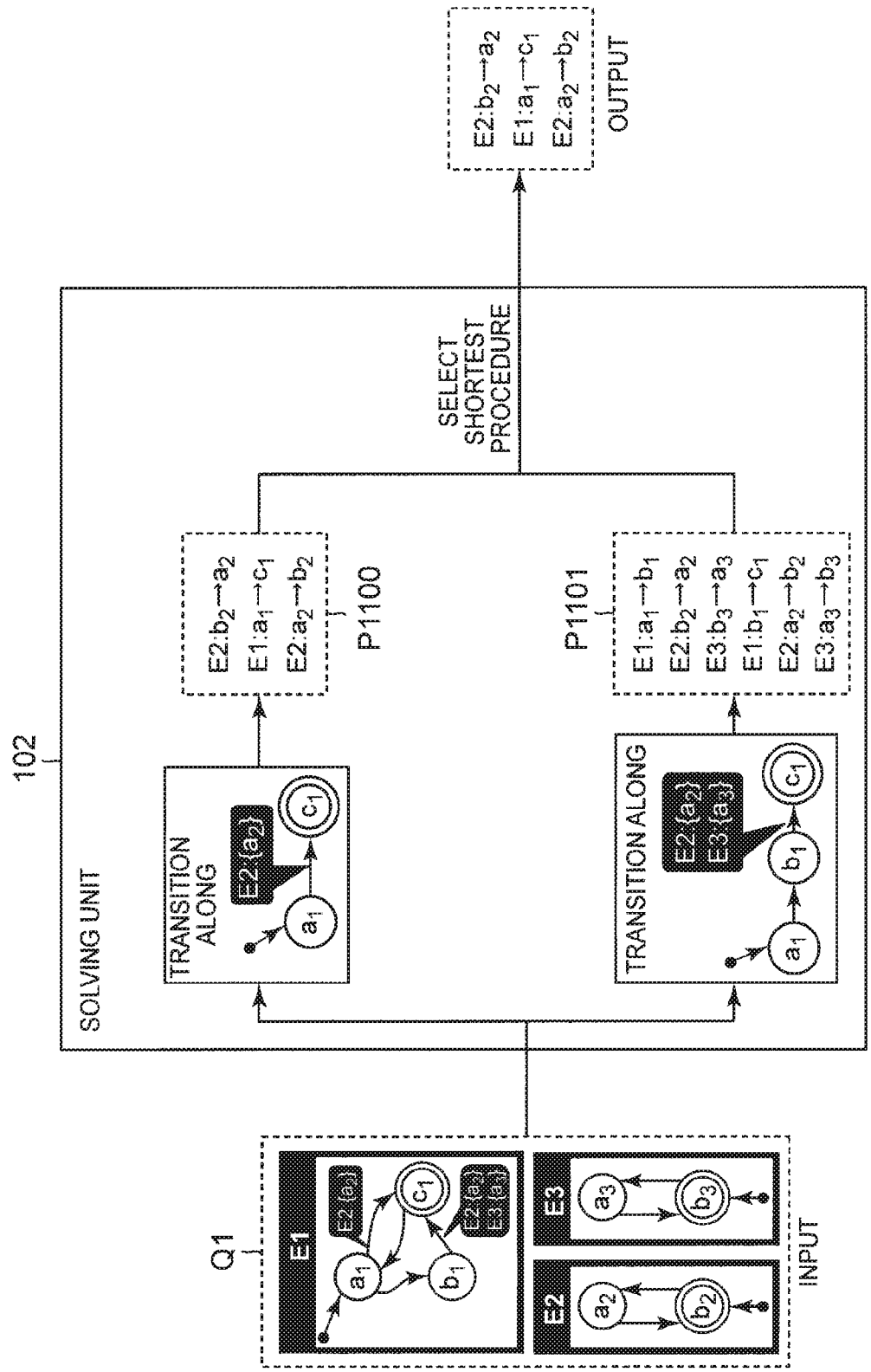
FIG. 6 is an explanatory diagram showing an example of the estimated distance calculating process performed by the solving unit 102.

Referring to FIG. 6 is described the estimated distance calculating process performed by the solving unit 102 when the relaxed problem Q1 showed in FIG. 5 is inputted. FIG. 6 is an explanatory diagram showing an example of the estimated distance calculating process performed by the solving unit 102.

The solving unit 102 obtains, for each of the non-redundant paths π, a procedure for transition of the state element E1 to the target state along the path. For transition along the path "$a_1 \to c_1$", it is first required for the state element E2 to transit to $a_2$ in accordance with dependency. Therefore, a procedure P1100 including three steps, "E2: $b_2 \to a_2$", "E1: $a_1 \to c_1$", and "E2: $a_2 \to b_2$", is obtained, as showed in FIG. 6.

The step "E2: $b_2 \to a_2$", for example, is for transition of the state element E2 from $b_2$ to $a_2$. That is to say, one step corresponds to one state transition. The final step "E2: $a_2 \to b_2$" is added for the state element E2 to arrive at the target state $b_2$.

For transition along the path "$a_1 \to b_1 \to c_1$", the following transitions are necessary in the mentioned order; transition of the state element E1 from the state $a_1$ to $b_1$, transition of the state element E2 to the state $a_2$ in accordance with dependency, and transition of the state element E3 to the state $a_3$. Therefore, a procedure P1101 including six steps is obtained, as showed in FIG. 6.

The solving unit 102 returns, as the solution, the length of the shortest procedure among the obtained procedures (step S129). In the example showed in FIG. 6, the solving unit 102 returns, as the solution, "3" which is the length of the procedure P1100 for state transition of the state element E1 along the path "$a_1 \to c_1$".

Figure 7:
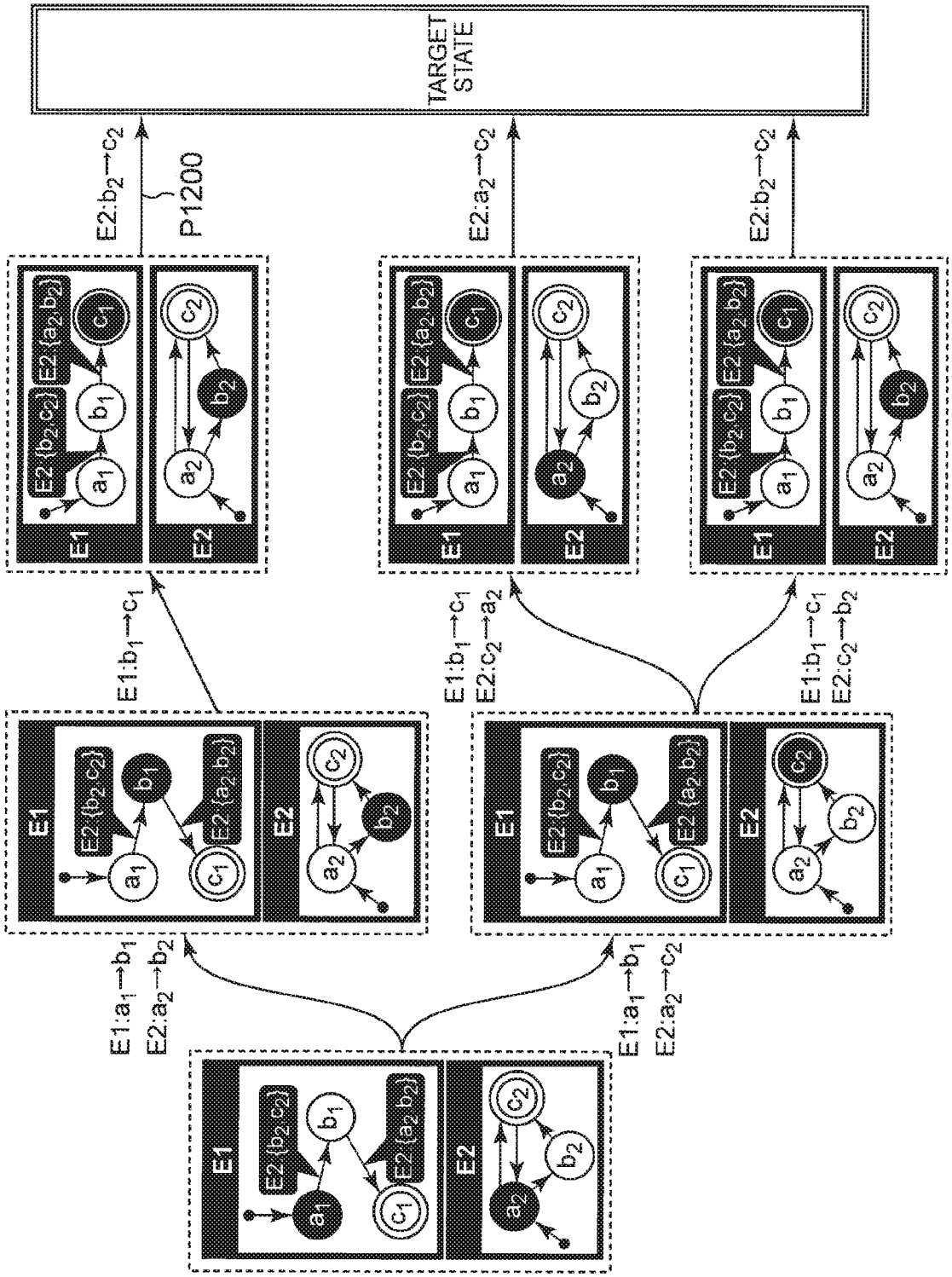
FIG. 7 is an explanatory diagram showing an example of a shortest path searching process using breadth first search simulation.

The shortest path, which is the solution to such a path-fixed relaxed problem as showed in FIG. 6, may be obtained by breadth first search simulation. FIG. 7 is an explanatory diagram showing an example of a shortest path searching process using breadth first search simulation.

The breadth first search simulation is an algorithm used to obtain the solution to such a path-fixed relaxed problem. In the dependency "E2:$\{b_2,c_2\}$" included in the state element E1 showed in FIG. 7 are specified two states of the state element E2. In an initial stage of the shortest path searching process showed in FIG. 7, therefore, two transition paths are presented; which of the state transitions should be selected.

When the breadth first search simulation is employed, the shortest one among the finally obtained procedures is selected. In the example showed in FIG. 7, a procedure P1200 is selected as the shortest path. The breadth first search simulation is a means used to find solutions to path-fixed relaxed problems. The solving unit 102 according to this exemplary embodiment may use any other suitable means but the breadth first search simulation to solve such a path-fixed relaxed problem.

Description of Effect

The estimated distance calculator 100 according to this exemplary embodiment has the constraint relaxing unit 101 and the solving unit 102. The constraint relaxing unit 101 relaxes part of dependencies included in a state element model to modify an automated planning problem into a quickly-solvable relaxed problem. The solving unit 102 solves the relaxed problem at high speed. The estimated distance calculator 100 calculates an estimated distance including, as additional factor, dependency in connection with any state element most affected by dependency and thereby accelerates the A* search executed to solve the automated planning problem that seeks the shortest path on the state element model.

The estimated distance calculator 100 according to this exemplary embodiment may succeed in accelerating the A* search because this device is equipped to not only accelerate the process to score the states during the A* search but also calculate, as score, a value approximate to a path length which is a true solution.

The constraint relaxing unit 101 focuses on one state element included in the state element model and deletes all of dependencies but dependencies associated with this state element of interest.

In this manner, the constraint relaxing unit 101, while taking into consideration part of the dependencies, generates a simpler relaxed problem than the original automated planning problem.

In connection with all of the state elements included in the state element model, the solving unit 102 compares solutions to the relaxed problems centered on the state elements. The solving unit 102 defines, as the estimated distance, one of the compared solutions showing a largest value. The estimated distance calculator 100 according to this exemplary embodiment relaxes the dependency of a problem so as to relax the problem to be solved at high speed and uses the length of the solution to the relaxed problem as the estimated distance. This device, therefore, may provide an estimated distance on which dependency-related impact is reflected.

Estimating a distance to the target state may be required to solve, by searching a shortest path using a heuristic function, an automated planning problem involved with a system including a plurality of small state diagrams that depend on other state diagrams. The estimated distance should desirably be not affected by local solutions in the state diagrams. In the estimated distance calculator 100 according to this exemplary embodiment, the constraint relaxing unit 101 generates simplified relaxed problems. Therefore, an estimated distance meeting the requirements described above may be successfully calculated.

Second Exemplary Embodiment

Description of Structure

A second exemplary embodiment of the present invention is hereinafter described referring to the accompanying drawings. The second exemplary embodiment describes an aspect provided to perform a verification method in the first exemplary embodiment.

Figure 8:
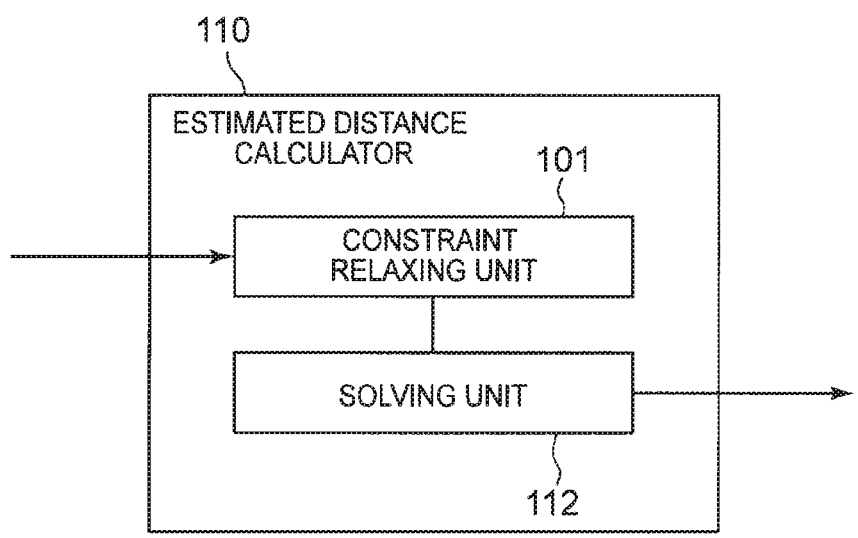
FIG. 8 is a block diagram showing a configuration example of a second exemplary embodiment of an estimated distance calculator 110 according to the present invention.

FIG. 8 is a block diagram showing a configuration example of a second exemplary embodiment of an estimated distance calculator 110 according to the present invention. As showed in FIG. 8, the estimated distance calculator 110 according to this exemplary embodiment has a constraint relaxing unit 101 and a solving unit 112.

The estimated distance calculator 110 according to this exemplary embodiment is provided with the solving unit 112, instead of the solving unit 102 according to the first exemplary embodiment. Any other structural features of the second exemplary embodiment but the solving unit 112 are similar to those of the first exemplary embodiment.

The solving unit 112, before solving the relaxed problem Q, divides a state element model indicated by the relaxed problem Q for each of state elements E_1, E_2, . . . , E_n, other than the state element $Q, included in the relaxed problem Q. The solving unit 112 thus divides the state element model indicated by the relaxed problem Q, and then obtains the length of a transition array.

Description of Operation

Figure 9:
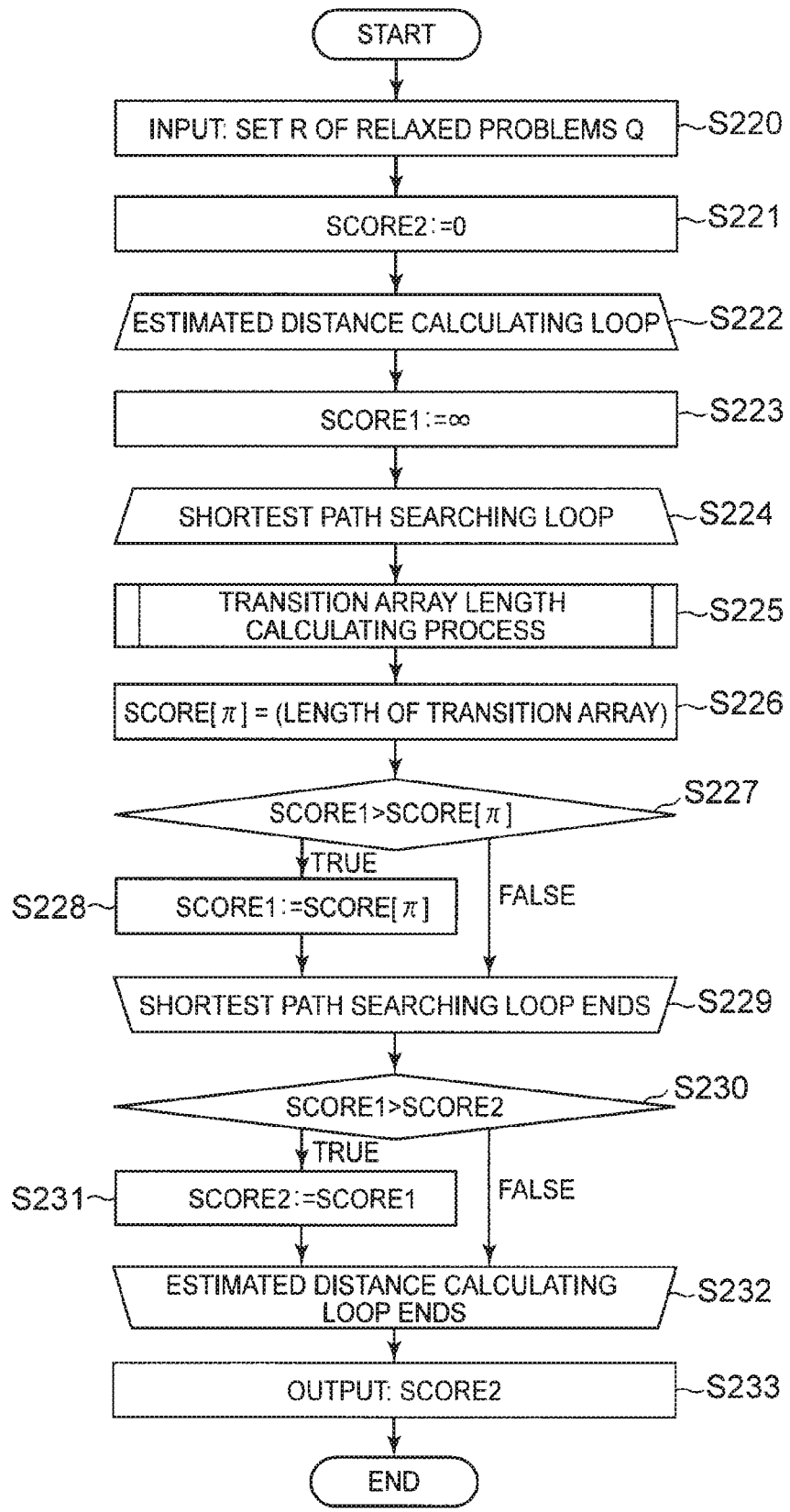
FIG. 9 is a flowchart showing an operation of an estimated distance calculating process performed by a solving unit 112.

Next, an estimated distance calculating process performed by the solving unit 112 according to this exemplary embodiment is hereinafter described. FIG. 9 is a flowchart showing an operation of the estimated distance calculating process performed by the solving unit 112. A relaxed problem generating process performed by the constraint relaxing unit 101 according to this exemplary embodiment is similar to that described in the first exemplary embodiment.

Except for step S225, the estimated distance calculating process performed by the solving unit 112 according to this exemplary embodiment is similar to that performed by the solving unit 102 according to the first exemplary embodiment. The set R of relaxed problems Q is inputted to the solving unit 112 likewise (step S220). The solving unit 112 calculates the transition array length for all of non-redundant paths π and returns, as the distance of the solution to the relaxed problem Q, the smallest value of the calculated transition array lengths (steps S224 to S229).

As with the solving unit 102 according to the first exemplary embodiment, the solving unit 112 calculates the transition array length by solving the relaxed problem Q having the non-redundant, fixed path π relevant to the state element $Q (step S225). How to calculate the transition array length is a distinction between the solving unit 112 according to this exemplary embodiment and the solving unit 102 according to the first exemplary embodiment.

Figure 10:
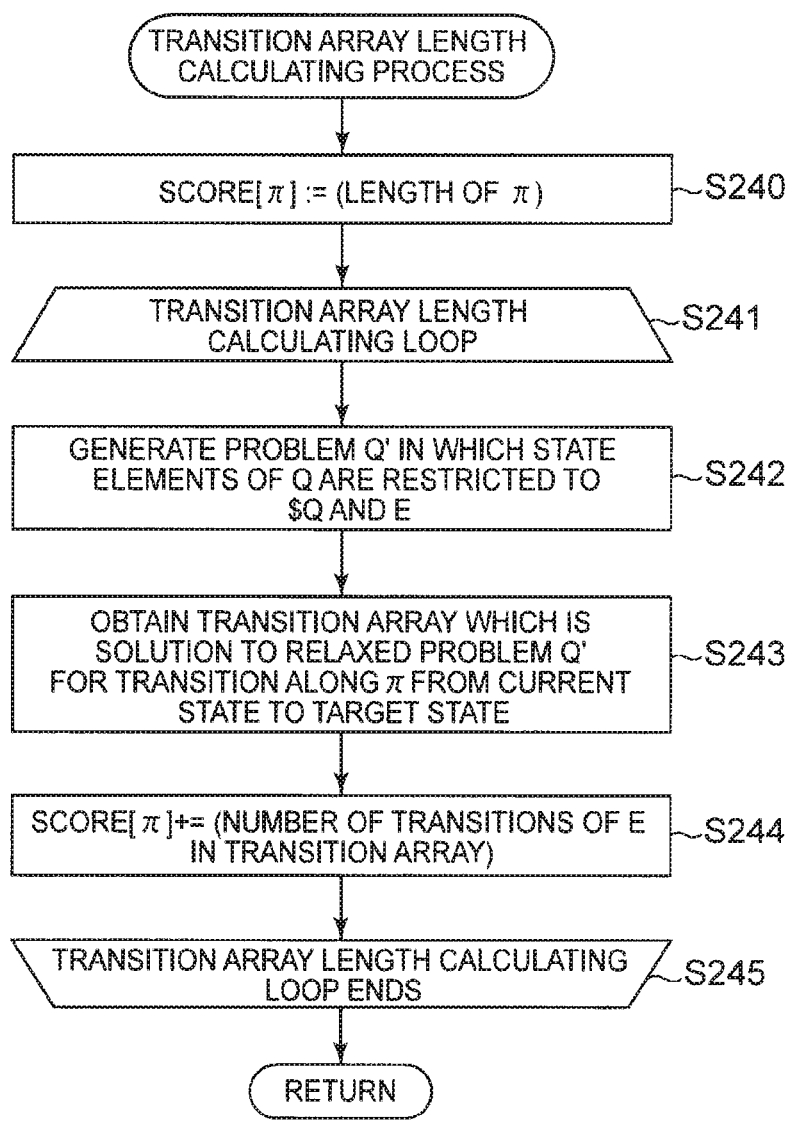
FIG. 10 is a flowchart showing an operation of a transition array length calculating process performed by the solving unit 112.

Next, a transition array length calculating process performed by the solving unit 112 according to this exemplary embodiment is hereinafter described. FIG. 10 is a flowchart showing an operation of the transition array length calculating process performed by the solving unit 112.

After the non-redundant path π is fixed, the solving unit 112 sets the length of π to SCORE[π] (step S240). Next, the solving unit 112 retrieves, out of any state elements but the state element $Q included in the relaxed problem Q, a state element E_i for which a state element model M_i is yet to be generated. This means that the operation enters a transition array length calculating loop (step S241).

The solving unit 112, after retrieving the state element E_i, removes any state elements but the state element $Q and the state element E_i from the state element model indicated by the relaxed problem Q so as to generate a new state element model M_i (step S242). Hereinafter, Q' refers to any problem expressed by the state element model M_i.

Then, the solving unit 112 obtains a transition array indicated by a shortest path on the state element model M_i for transition of the state element $Q along the path π from the current state to the target state (step S243).

Next, the solving unit 112 counts, among the transition arrays obtained in step S243, the number of state transitions relevant to the state element E_i. Next, the solving unit 112 adds the number of counted state transitions to SCORE[π] (step S244).

The solving unit 112 repeatedly executes steps S242 to S244 for any state element E_i for which the state element model M_i is yet to be generated among any state elements but the state elements $Q included in the relaxed problem Q. Steps S242 to S244 are repeatedly performed for each and all of any state elements E_i but the state element $Q included in the relaxed problem Q.

After the state element models M_1, M_2, . . . , and M n are generated in connection with the state elements E_1, E_2, . . . , and E_n other than the state element $Q included in the relaxed problem Q, the solving unit 112 exits the transition array length calculating loop (step S245).

At the time of the solving unit 112 exiting the transition array length calculating loop, the summed number of state transitions which are obtained in connection with the state element models, and path π length in total are stored in SCORE[π]. The solving unit 112 defines SCORE[π] at the time of exiting the transition array length calculating loop as the distance of the solution to the relaxed problem Q when the path π is fixed. After the distance of the solution to the relaxed problem Q is obtained, the solving unit 112 proceeds to step S226.

Figure 11:
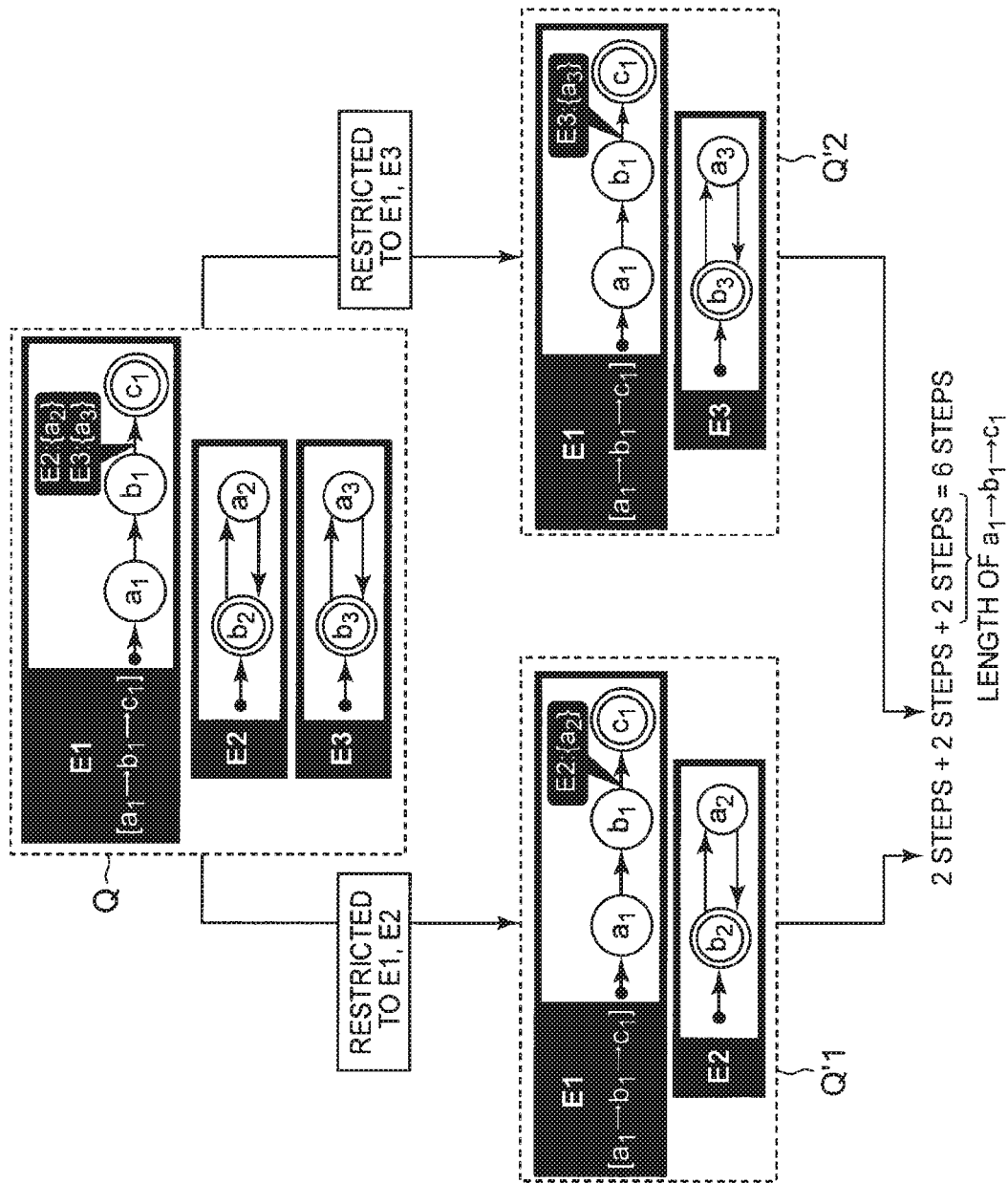
FIG. 11 is an explanatory diagram showing an example of the transition array length calculating process performed by the solving unit 112.

Next, the transition array length calculating process performed by the solving unit 112 is hereinafter described referring to FIG. 11. FIG. 11 is an explanatory diagram showing an example of the transition array length calculating process performed by the solving unit 112.

In the transition array length calculating process showed in FIG. 11, the solving unit 112 handles the relaxed problem Q in which state transition of the state element E1 is fixed to a non-redundant path "$a_1 \to b_1 \to c_1$". The solving unit 112 divides the relaxed problem Q into a problem Q'1 representing a state element model solely consisting of state elements E1 and E2, and a problem Q'2 representing a state element model solely consisting of state elements E1 and E3 (step S242).

Next, the solving unit 112 obtains solutions to the problems Q'1 and Q'2 (step S243). The solution to the problem Q' 1 indicates that state transition of the state element E2 occurs twice. The solution to the problem Q'2 indicates that state transition of the state element E3 occurs twice. Therefore, the length of the solution to the relaxed problem Q is 2+2+2=6 (step S244).

Description of Effect

The solving unit 112 according to this exemplary embodiment divides the relaxed problem for different state elements and then solves the relaxed problem by summing the solutions to the divided problems. In the estimated distance calculator 110 according to this exemplary embodiment, the solving unit 112 further subdivides the relaxed problem than in the first exemplary embodiment, which may allow the estimated distance to be calculated at higher speeds. The estimated distance calculator 110 according to this exemplary embodiment may be particularly advantageous when handling problems seeking a shortest path on a state element model including abundant state elements.

Third Exemplary Embodiment

Description of Structure

A third exemplary embodiment of the present invention is hereinafter described referring to the accompanying drawings.

Figure 12:
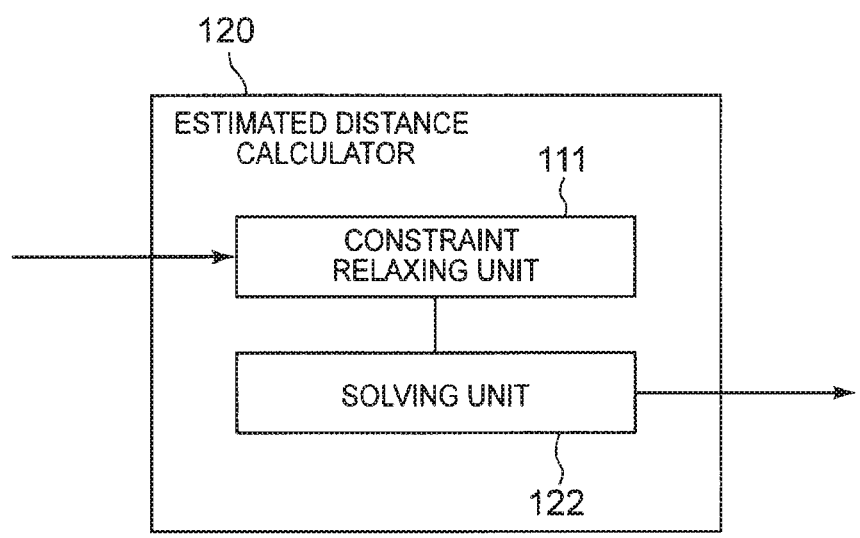
FIG. 12 is a block diagram showing a configuration example of a third exemplary embodiment of an estimated distance calculator 120 according to the present invention.

FIG. 12 is a block diagram showing a configuration example of a third exemplary embodiment of an estimated distance calculator 120 according to the present invention. As showed in FIG. 12, the estimated distance calculator 120 according to this exemplary embodiment has a constraint relaxing unit 111 and a solving unit 122.

In the estimated distance calculator 120 according to this exemplary embodiment, the constraint relaxing unit 101 and the solving unit 102 according to the first exemplary embodiment are respectively replaced with the constraint relaxing unit 111 and the solving unit 122.

The constraint relaxing unit 111 focuses on one state element $Q included in the state element model. The constraint relaxing unit 111 traces "dependency destinations" included in the state element $Q one after another. By tracing the "dependency destinations", the constraint relaxing unit 111 selects dependencies originating from the state element $Q of interest alone. The constraint relaxing unit 111 deletes any dependencies but the selected dependencies from the state element model.

In this manner, the constraint relaxing unit 111, while more carefully taking into consideration dependency-related impacts than the constraint relaxing unit 101 according to the first exemplary embodiment, generates a more simplified relaxed problem than the original automated planning problem.

The solving unit 122, before solving the relaxed problem Q, divides a state element model indicated by the relaxed problem Q for each one of state elements $E\_1, E\_2, \ldots, E\_n$ which the state element $Q directly depends upon. The solving unit 122, after dividing the state element model indicated by the relaxed problem Q, obtains the length of a transition array.

Description of Operation

Figure 13:
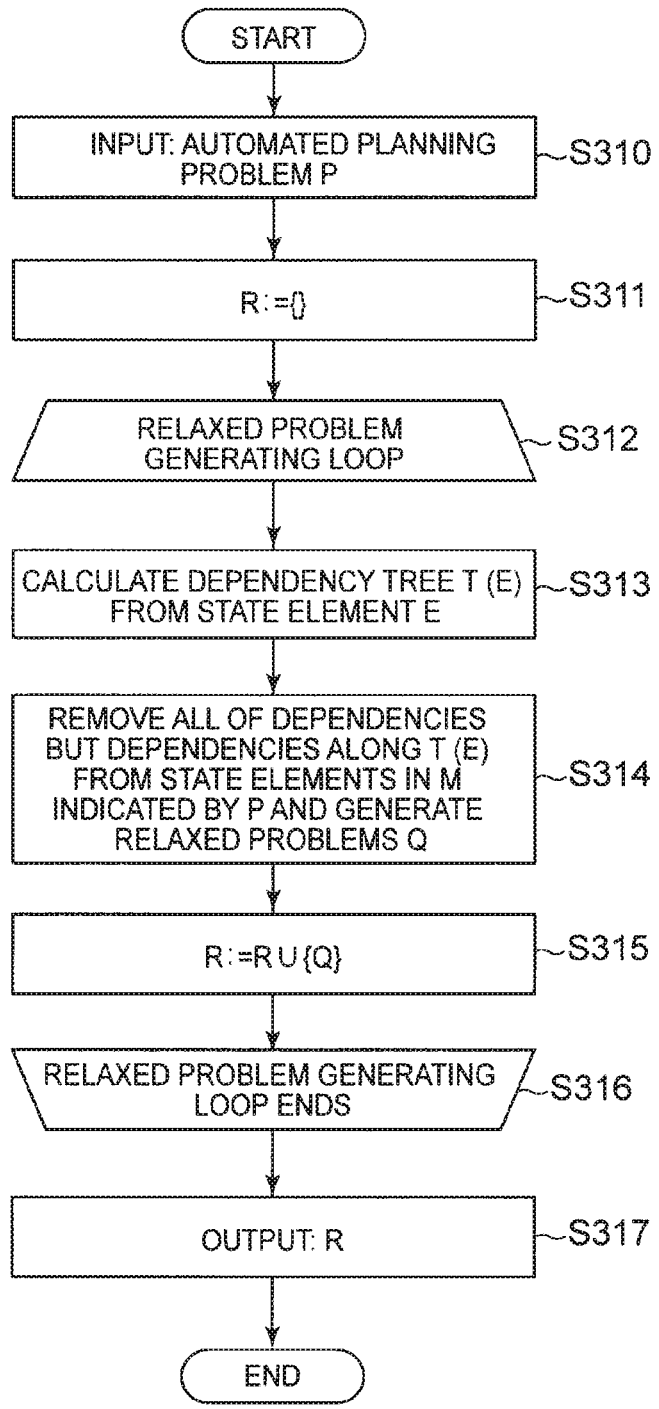
FIG. 13 is a flowchart showing an operation of a relaxed problem generating process performed by a constraint relaxing unit 111.
Figure 19:
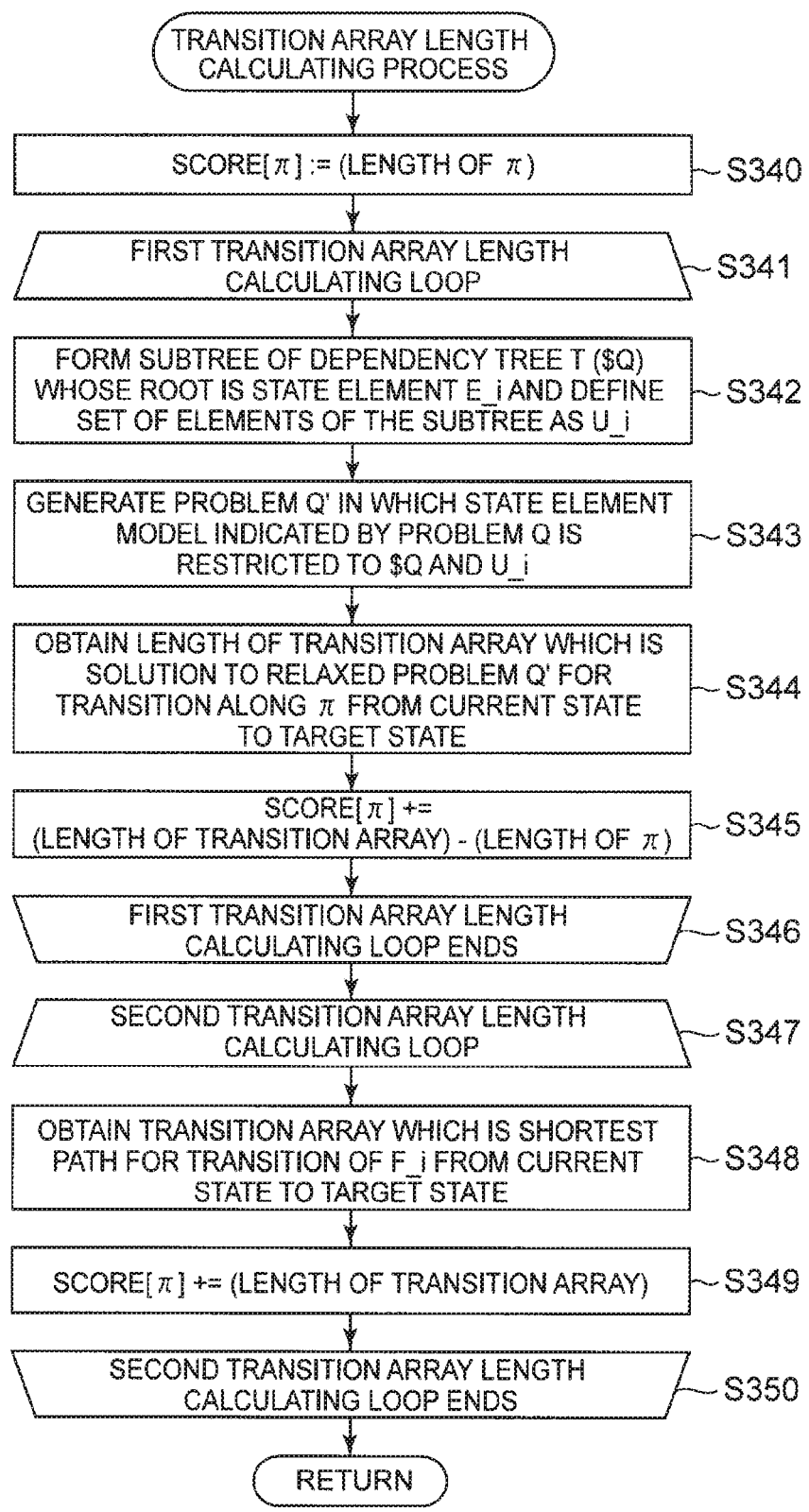
FIG. 19 is a flowchart showing an operation of a transition array length calculating process performed by a solving unit 122.

The operation to output the estimated distance obtained by an estimated distance calculator 120 according to this exemplary embodiment is hereinafter described referring to FIGS. 13 and 19.

The description starts with a relaxed problem generating process performed by the constraint relaxing unit 111. FIG. 13 is a flowchart showing an operation of the relaxed problem generating process performed by the constraint relaxing unit 111.

After an automated planning problem P that seeks a shortest path on the state element model M is inputted to the estimated distance calculator 120, the automated planning problem P is inputted to the constraint relaxing unit 111 (step S310). Then, the constraint relaxing unit 111 defines a set R as void set (empty set) (step S311).

Next, the constraint relaxing unit 111 retrieves, out of the state elements included in the state element model M, a state element E for which any relaxed problem Q relevant to itself is yet to be generated. This means that the operation enters a relaxed problem generating loop (step S312).

The constraint relaxing unit 111, on the basis of the retrieved state element E, generates a dependency tree T (E) relevant to the state element E (step S313). The dependency tree T (E) relevant to the state element E of the state element model M is a tree generated by connecting state elements included in the state element model M with arrows.

However, the state elements E1 and E2 are connected with an arrow, like "E1→E2", in the dependency tree T (E) only when dependency on the state of the state element E2 is associated with state transition of the state element E1 included in the state element model M.

The constraint relaxing unit 111 generates the relaxed problem Q relevant to the retrieved state element E (step S314). More specifically, the constraint relaxing unit 111 generates the relaxed problem Q relevant to the state element E by deleting, from dependencies included in the state element model M, all of dependencies but dependencies having the same direction as arrows constituting the dependency tree T (E) calculated in step S313.

For example, dependency "having the same direction" as the "arrow E1→E2 constituting the dependency tree T (E)" is "dependency on the state of the state element E2 associated with state transition of the state element E1".

Next, the constraint relaxing unit 111 redefines the set R as a set to which the relaxed problems Q have been added (step S315). This means that the constraint relaxing unit 111 adds the relaxed problems Q generated in step S314 to the elements of the set R.

The constraint relaxing unit 111 repeatedly executes steps S313 to S315 for any state element E for which any relaxed problem Q relevant to itself is yet to be generated among the state elements included in the state element model M. Steps S313 to S315 are repeatedly performed for each and all of the state elements included in the state element model M.

After the relaxed problems Q relevant to all of the state elements included in the state element model M are generated, the constraint relaxing unit 111 exits the relaxed problem generating loop (step S316). The constraint relaxing unit 111 that exited the relaxed problem generating loop outputs the set R (step S317). After the output of the set R, the constraint relaxing unit 111 ends the relaxed problem generating process.

In step S313, the constraint relaxing unit 111 obtains the dependency tree T (E) by providing arrows while tracing the state elements by, for example, breadth first search. The breadth first search is an algorithm used for exhaustive scans of the diagram.

The constraint relaxing unit 111 according to this exemplary embodiment regards the relationship in the state element model, "dependency on the state of the state element E2 is associated with state transition of the state element E1" as "branch (arrow) is extending from the state element E1 to the state element E2".

The constraint relaxing unit 111 thus regards each relationship as "branch" and interprets the state element model M as one diagram. The constraint relaxing unit 111 is allowed to calculate the dependency tree T (E) by exhaustively scanning the diagram of the state element model M using breadth first search, starting from the state element E.

Figure 14:
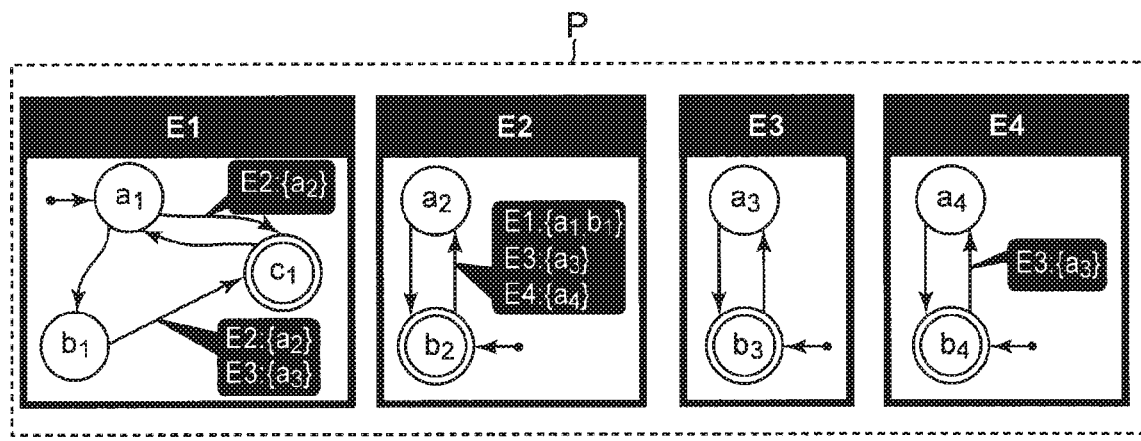
FIG. 14 is an explanatory diagram showing an example of automated planning problem P inputted to the constraint relaxing unit 111.

FIG. 14 is an explanatory diagram showing an example of automated planning problem P inputted to the constraint relaxing unit 111. As showed in FIG. 14, the state element model M indicated by the automated planning problem P includes state elements E1 to E4.

The state element E1 includes state transitions associated with dependencies on the state of the state element E2 and on the state of the state element E3. The state elements E2 and E4 respectively include state transitions associated with dependencies on states of the other state elements.

Figure 15:
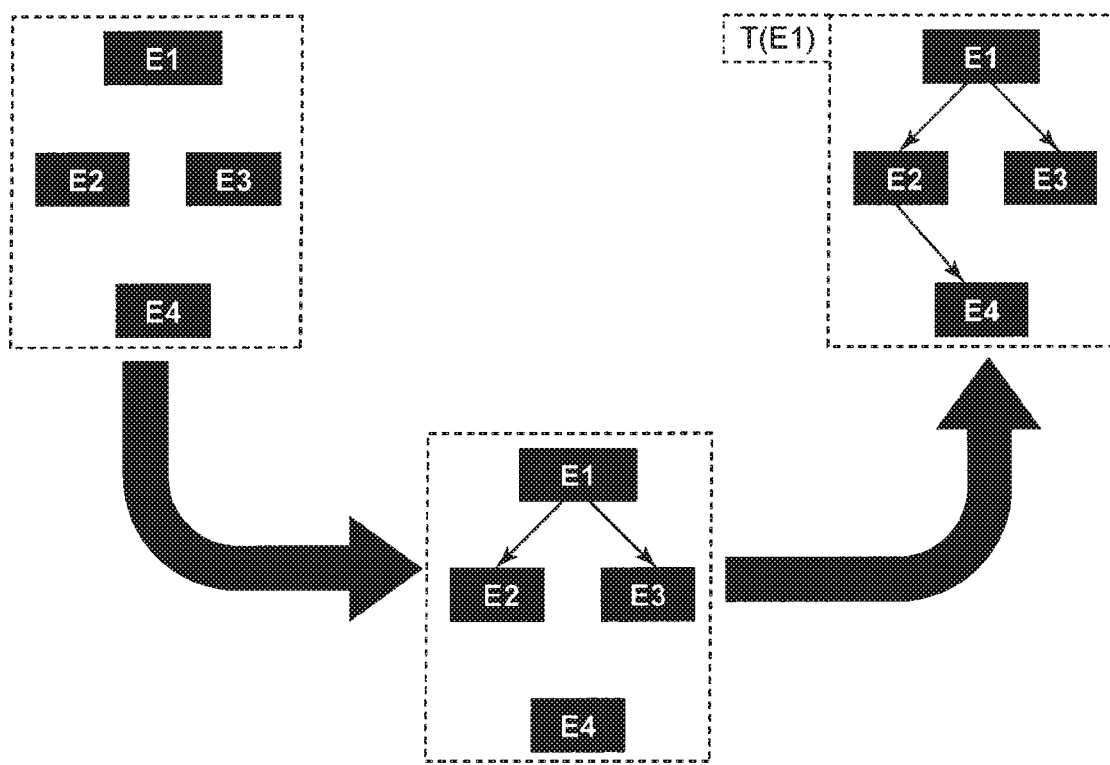
FIG. 15 is an explanatory diagram showing an example of a dependency tree calculating process performed by the constraint relaxing unit 111.

FIG. 15 is an explanatory diagram showing an example of a dependency tree calculating process performed by the constraint relaxing unit 111. FIG. 15 shows the dependency tree calculating process using the breadth first search. Also, the dependency tree calculating process showed in FIG. 15 is a calculating process relevant to the state element E1 included in the state element model showed in FIG. 14.

Rectangular boxes of FIG. 15 painted in black each represent a state element. The constraint relaxing unit 111 appends, to the state element E1 in the left dashed rectangle of FIG. 15, arrows which are respectively directed toward the state element E2 and toward the state element E3, as showed in the center dashed rectangle of FIG. 15.

Similarly, the constraint relaxing unit 111 appends, to the state element E2 in the center dashed rectangle of FIG. 15, an arrow directed toward the state element E4, as showed in the right dashed rectangle of FIG. 15. A set of state elements and arrows showed in the right dashed rectangle of FIG. 15 constitutes the dependency tree T (E1) calculated and obtained by the constraint relaxing unit 111.

The breadth first search is an algorithm used by the constraint relaxing unit 111 to calculate a dependency tree. The constraint relaxing unit 111 according to this exemplary embodiment may use any suitable algorithm but the breadth first search for dependency tree calculation.

Depending on what algorithm is used for calculation, different dependency trees may be obtained from the same inputted information. The constraint relaxing unit 111 according to this exemplary embodiment may use any type of dependency tree to generate a relaxed problem. Therefore, such variability of the dependency tree finally obtained should not be a problem. The relaxed problem generating process using dependency trees performed by the constraint relaxing unit 111 is hereinafter described referring to the drawings.

Figure 16:
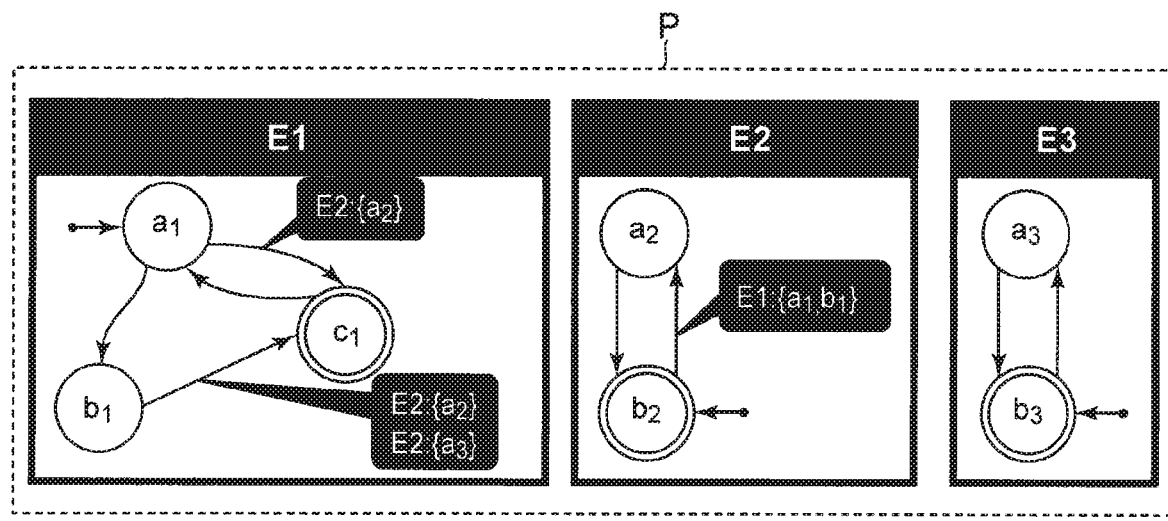
FIG. 16 is an explanatory diagram showing another example of automated planning problem P inputted to the constraint relaxing unit 111.

FIG. 16 is an explanatory diagram showing another example of automated planning problem P inputted to the constraint relaxing unit 111. As showed in FIG. 16, the state element model M indicated by the automated planning problem P includes a state element E1, a state element E2, and a state element E3.

Figure 17:
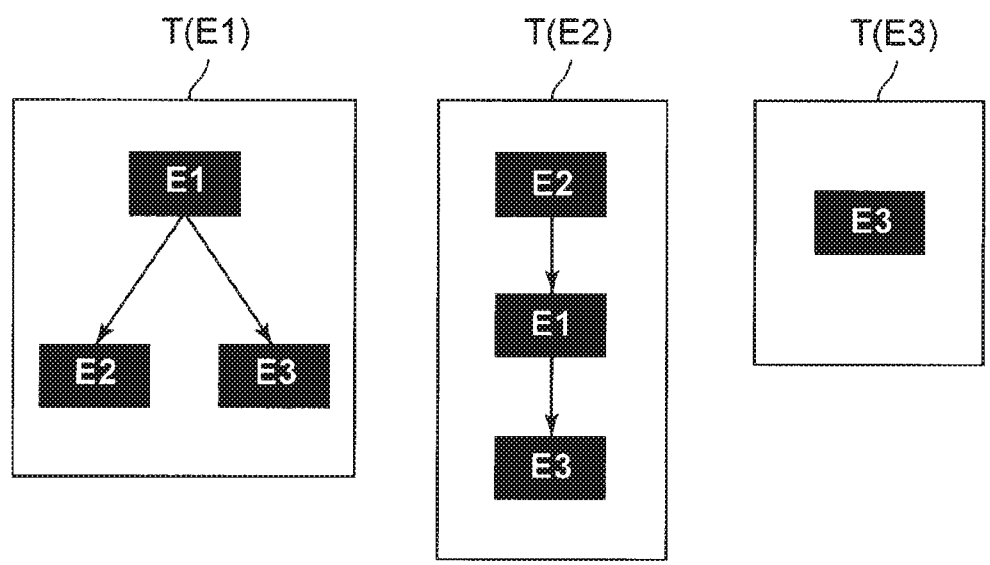
FIG. 17 is an explanatory diagram showing an example of a dependency tree generated by the constraint relaxing unit 111.

FIG. 17 is an explanatory diagram showing an example of a dependency tree generated by the constraint relaxing unit 111. The dependency tree T (E1) showed in FIG. 17 is a dependency tree calculated in connection with the state element E1 included in the state element model M showed in FIG. 16.

Similarly, a dependency tree T (E2) and a dependency tree T (E3) showed in FIG. 17 are respectively a dependency tree calculated in connection with the state element E2 included in the state element model M showed in FIG. 16 and a dependency tree calculated in connection with the state element E3 included in the same state element model M.

Figure 18:
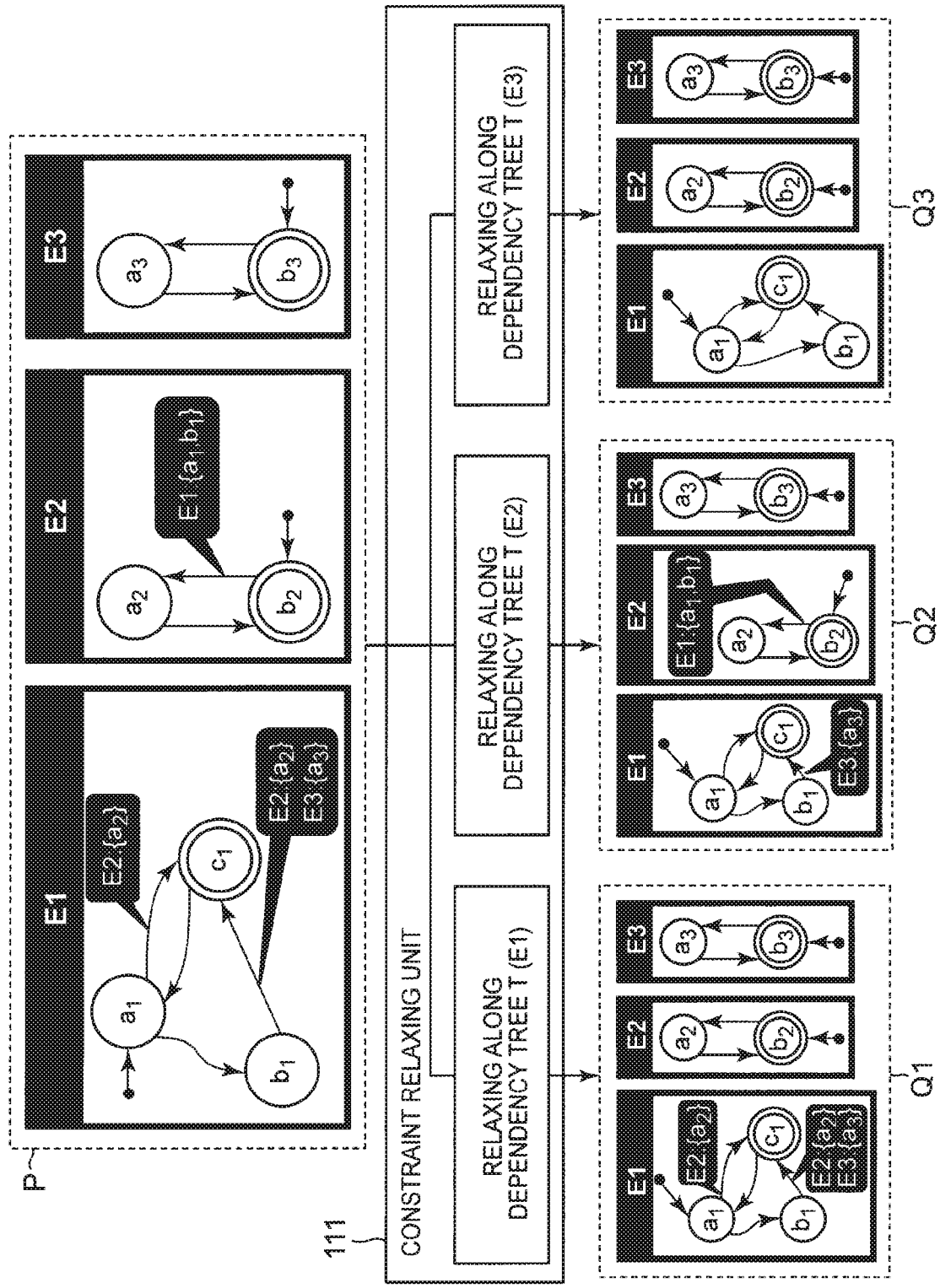
FIG. 18 is an explanatory diagram showing an example of the relaxed problem generating process performed by the constraint relaxing unit 111.

FIG. 18 is an explanatory diagram showing an example of the relaxed problem generating process performed by the constraint relaxing unit 111. FIG. 18 shows a process performed by the constraint relaxing unit 111 to generate three relaxed problems using the dependency trees T (E1), T (E2), and T (E3) showed in FIG. 17.

The constraint relaxing unit 111 relaxes the automated planning problem P that seeks the shortest path on the state element model M using the relaxed problem generating process. Specifically, the constraint relaxing unit 111, when relaxing the automated planning problem P in connection with the state element E1, first obtains the dependency tree T (E1), like the one showed in FIG. 17. Next, the constraint relaxing unit 111 generates a relaxed problem Q1 which is the automated planning problem P from which all of dependencies but dependencies having the same direction as arrows constituting the dependency tree T (E1) have been deleted.

To generate the relaxed problem Q1, the constraint relaxing unit 111 deletes dependency "E1:$\{a_1 \rightarrow b_1\}$" associated with transition of the state element E2 from the state $b_2$ to the state $a_2$. This dependency is deleted because the dependency tree T (E1) does not include any arrow having the same direction as "dependency on the state of the state element E1 associated with state transition of the state element E2", i.e., arrow directed from the state element E2 toward the state element E1.

Similarly, the constraint relaxing unit 111, when relaxing the automated planning problem P in connection with the state elements E2 and E3, generates relaxed problems Q2 and Q3. The constraint relaxing unit 111 outputs the generated relaxed problems Q1 to Q3.

Next, the estimated distance calculating process performed by the solving unit 122 is hereinafter described. The estimated distance calculating process performed by the solving unit 122 according to this exemplary embodiment is similar to the estimated distance calculating process showed in FIG. 9. The transition array length calculating process in step S225 performed by the solving unit 122 according to this exemplary embodiment is distinct from the transition array length calculating process performed by the solving unit 112 according to the second exemplary embodiment.

The transition array length calculating process performed by the solving unit 122 according to this exemplary embodiment is hereinafter described. FIG. 19 is a flowchart showing an operation of the transition array length calculating process performed by the solving unit 122.

In the second exemplary embodiment, "the state element still including dependency among the state elements included in the relaxed problem Q" is recited as the state element $Q. In this exemplary embodiment, "the root of the dependency tree used to generate the relaxed problem Q" is recited as the state element $Q. In the example showed in FIG. 17, the root of the dependency tree T (E1) is the state element E1.

The constraint relaxing unit 111 generates the relaxed problem Q using the dependency tree T ($Q). Hereinafter, the "dependency tree T ($Q)" refers to a dependency tree used to generate the relaxed problem Q. The transition array length calculating process is hereinafter described based on the assumption that a non-redundant path π on the state element $Q is fixed.

After the non-redundant path π is fixed, the solving unit 122 sets the length of π in SCORE[π] (step S340). Next, the solving unit 122 retrieves, out of the "state elements with arrows directly extending from the state element $Q in the dependency tree T ($Q)", a state element E_i for which no subtree has been formed. This means that the operation enters a first transition array length calculating loop (step S341).

The solving unit 122 that retrieved the state element E_i then forms, in the dependency tree T ($Q), a subtree whose root is the state element E_i. The solving unit 122 retrieves, out of the dependency tree T ($Q), any part reachable from the state element E_i along arrows as a subtree (step S342). A set of state elements included in the retrieved subtree is hereinafter referred to as "U_i".

The solving unit 122 that retrieved the subtree then removes any state elements but the set U_i and the state element $Q from the state element model indicated by the relaxed problem Q to generate a new state element model M_i (step S343). Hereinafter, Q' refers to any problem expressed by the state element model M_i.

Then, the solving unit 122 obtains the length of a transition array, which is the solution to the problem Q', indicated by the shortest path on the state element model M_i for state transition of the state element $Q along the path π from the current state to the target state (step S344).

Then, the solving unit 122 adds, to SCORE[π], a value obtained by subtracting the length of the fixed path π from the transition array length obtained in step S344 (step S345).

The solving unit 122 repeatedly executes steps S342 to S345 for any state element E_i for which no subtree has been formed among the state elements with arrows directly extending from the state element $Q in the dependency tree T ($Q). Steps S342 to S345 are repeatedly performed for each and all of the state elements E_i with arrows directly extending from the state element $Q in the dependency tree T ($Q).

The solving unit 122 exits the first transition array length calculating loop after the subtrees are formed in connection with all of the state elements E_i with arrows directly extending from the state element $Q in the dependency tree T ($Q) (step S346).

Next, the solving unit 122 retrieves, out of "any state elements but the state elements constituting the dependency tree T ($Q) included in the state element model indicated by the relaxed problem Q", a state element F_i for which a transition array length is yet to be calculated. This means that the operation enters a second transition array length calculating loop (step S347).

The retrieved state element F_i is a state element in which all of dependencies have been removed from the state transitions by the constraint relaxing unit 111. None of the state elements indicated by the relaxed problem Q includes dependency on the state element F_i. Therefore, the solving unit 122 may allow any optional state transition of the state element F_i in connection with the relaxed problem Q.

Then, the solving unit 122 obtains a transition array indicated by the shortest path on the state element model indicated by the relaxed problem Q for transition of the state element F_i from the current state to the target state (step S348). The solving unit 122 may accordingly easily obtain the shortest path for transition of the state element F_i from the current state to the target state.

Next, the solving unit 122 adds, to SCORE[π], the length of the transition array indicated by the shortest path obtained in step S348 (step S349).

The solving unit 122 repeatedly executes steps S348 and S349 for any state element F_i for which a transition array length is yet to be calculated among any state elements but the state elements constituting the dependency tree T ($Q). Steps S348 and S349 are repeatedly performed for each and all of any state elements F_i but the state elements constituting the dependency tree T ($Q) in the state element model indicated by the relaxed problem Q.

The solving unit 122 exits the second transition array length calculating loop after the transition array lengths are calculated in connection with all of the state elements F_i but the state elements constituting the dependency tree T ($Q) (step S350).

The solving unit 122 defines SCORE[π] at the time of exiting the second transition array length calculating loop as the distance of the solution to the relaxed problem Q when the path π is fixed. After the distance of the solution to the relaxed problem Q is obtained, the solving unit 122 proceeds to step S226.

Figure 20:
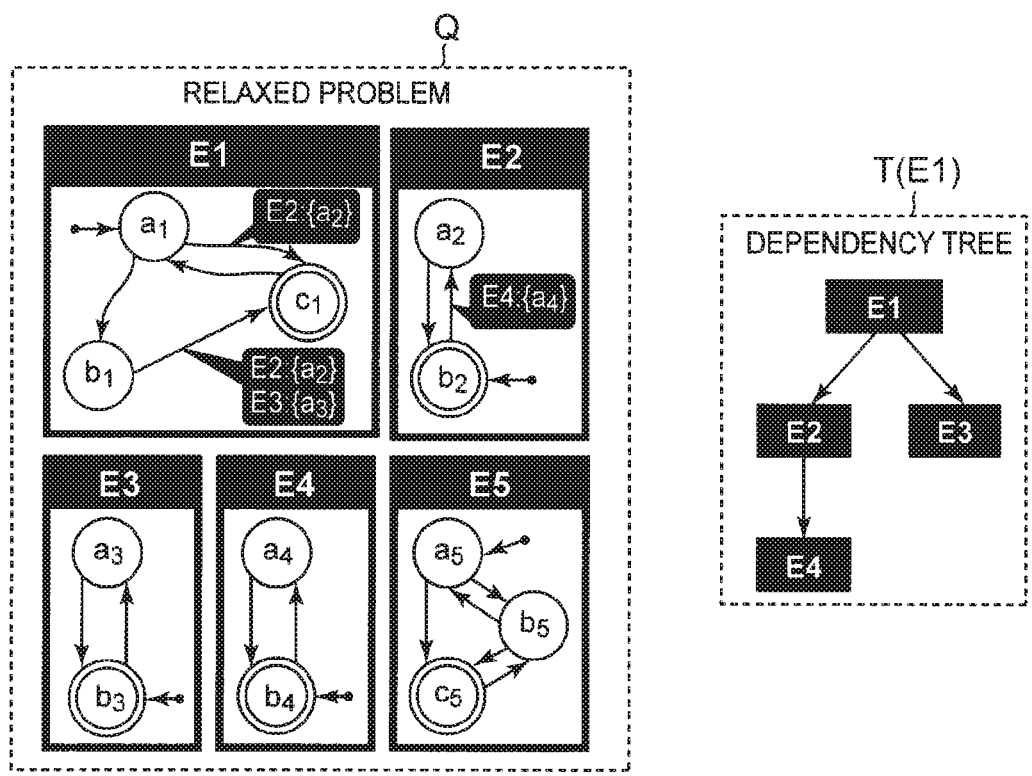
FIG. 20 is an explanatory diagram showing a relaxed problem Q inputted to the solving unit 122 and an example of dependency tree T (E1) used to generate the relaxed problem Q.

Next, the transition array length calculating process performed by the solving unit 122 is hereinafter described referring to the drawing. FIG. 20 is an explanatory diagram showing the relaxed problem Q inputted to the solving unit 122 and an example of the dependency tree T (E1) used to generate the relaxed problem Q.

The relaxed problem Q showed in FIG. 20 is a problem relaxed along the dependency tree T (E1). In the state element E1, dependency "E2: $\{a_2\}$" is associated with the state transition from $a_1$ to $c_1$, and dependencies "E2: $\{a_2\}$" and "E3: $\{a_3\}$" are associated with the state transition from $b_1$ to $c_1$, as showed in FIG. 20. In the state element E2, dependency "E4:$\{a_4\}$" is associated with the state transition from $b_2$ to $a_2$.

In the dependency tree T (E1) showed in FIG. 20, arrows are extending from the state element E1 to the state element E2 and from the state element E1 to the state element E3. Also, an arrow is extending from the state element E2 to the state element E4. The state element E5 is not included in the dependency tree T (E1).

Figure 21:
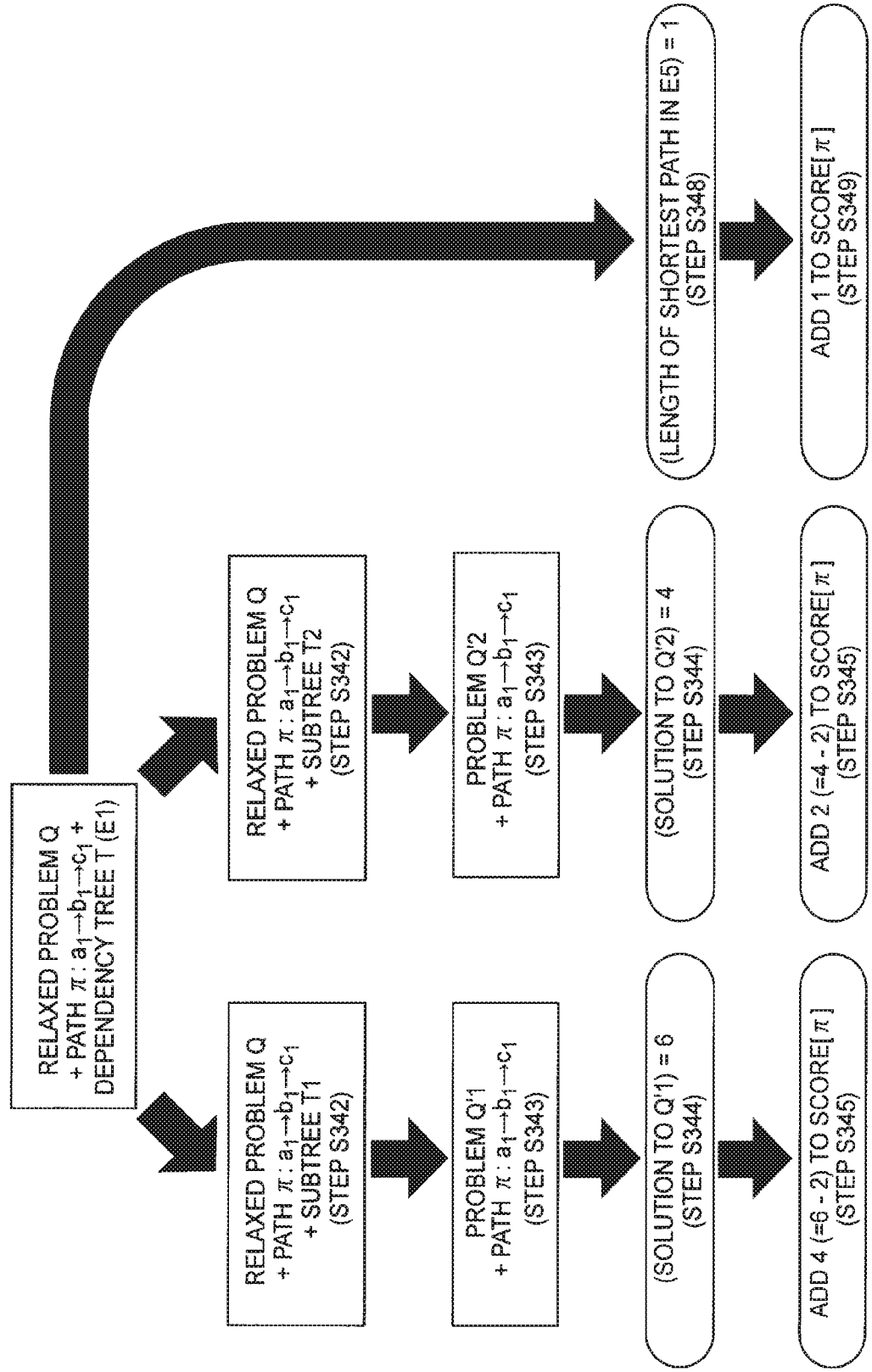
FIG. 21 is an explanatory diagram showing a process to calculate the distance of the solution to the relaxed problem Q in the transition array length calculating process performed by the solving unit 122.

FIG. 21 is an explanatory diagram showing a process to calculate the distance of the solution to the relaxed problem Q in the transition array length calculating process performed by the solving unit 122. In the transition array length calculating process showed in FIG. 21, the solving unit 122 handles the relaxed problem Q in which state transition of the state element E1 is fixed to a non-redundant path $\pi$="$a_1 \to b_1 \to c_1$".

In the transition array length calculating process showed in FIG. 21, the solving unit 122 generates a subtree T1 whose root is the state element E2 with an arrow directly extending from the state element E1 which is the root of the dependency tree T (E1), and also generates a subtree T2 whose root is the state element E3 with an arrow directly extending from the state element E1 (step S342).

Figure 22:
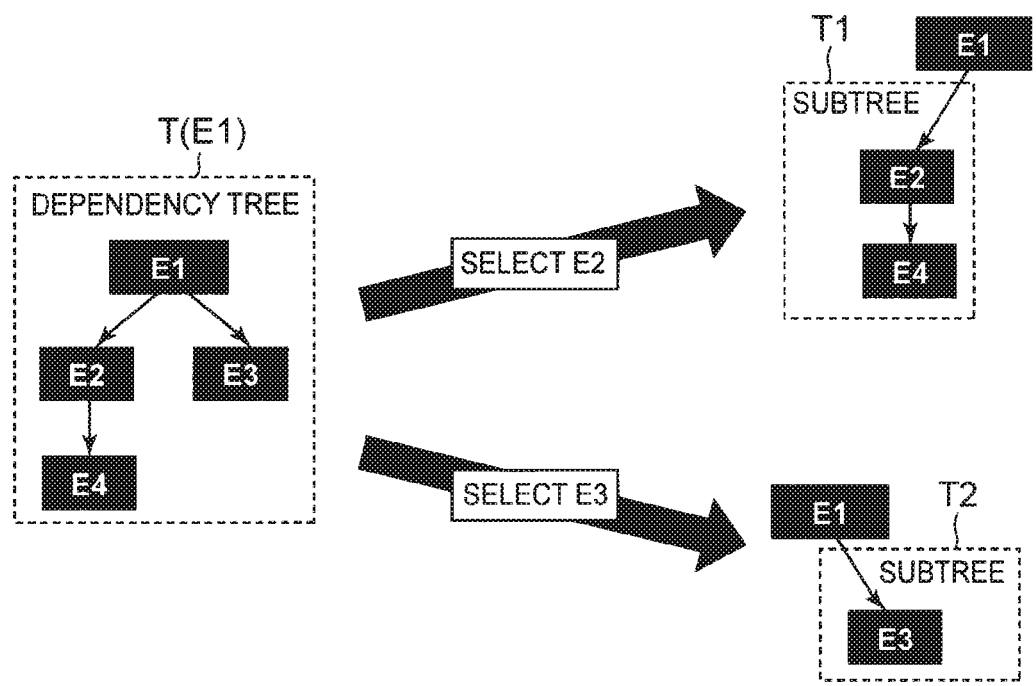
FIG. 22 is an explanatory diagram showing an example of subtrees generated by the solving unit 122.

FIG. 22 is an explanatory diagram showing an example of subtrees generated by the solving unit 122. The subtrees showed in FIG. 22 are each obtained by selecting one branch from the dependency tree in a stage of the transition array length calculating process performed by the solving unit 122.

The subtree T1 of FIG. 22 is generated when the state element E2 is selected as root. The subtree T1 includes the state elements E2 and E4. An arrow is extending from the state element E2 to the state element E4.

The subtree T2 of FIG. 22 is generated when the state element E3 is selected as root. The subtree T2 includes the state element E3 alone, i.e., one node. The subtree T2 has no arrow.

Next, the solving unit 122 restricts the state element model indicated by the relaxed problem Q using the state elements included in the subtrees T1 and T2 (step S343).

Figure 23:
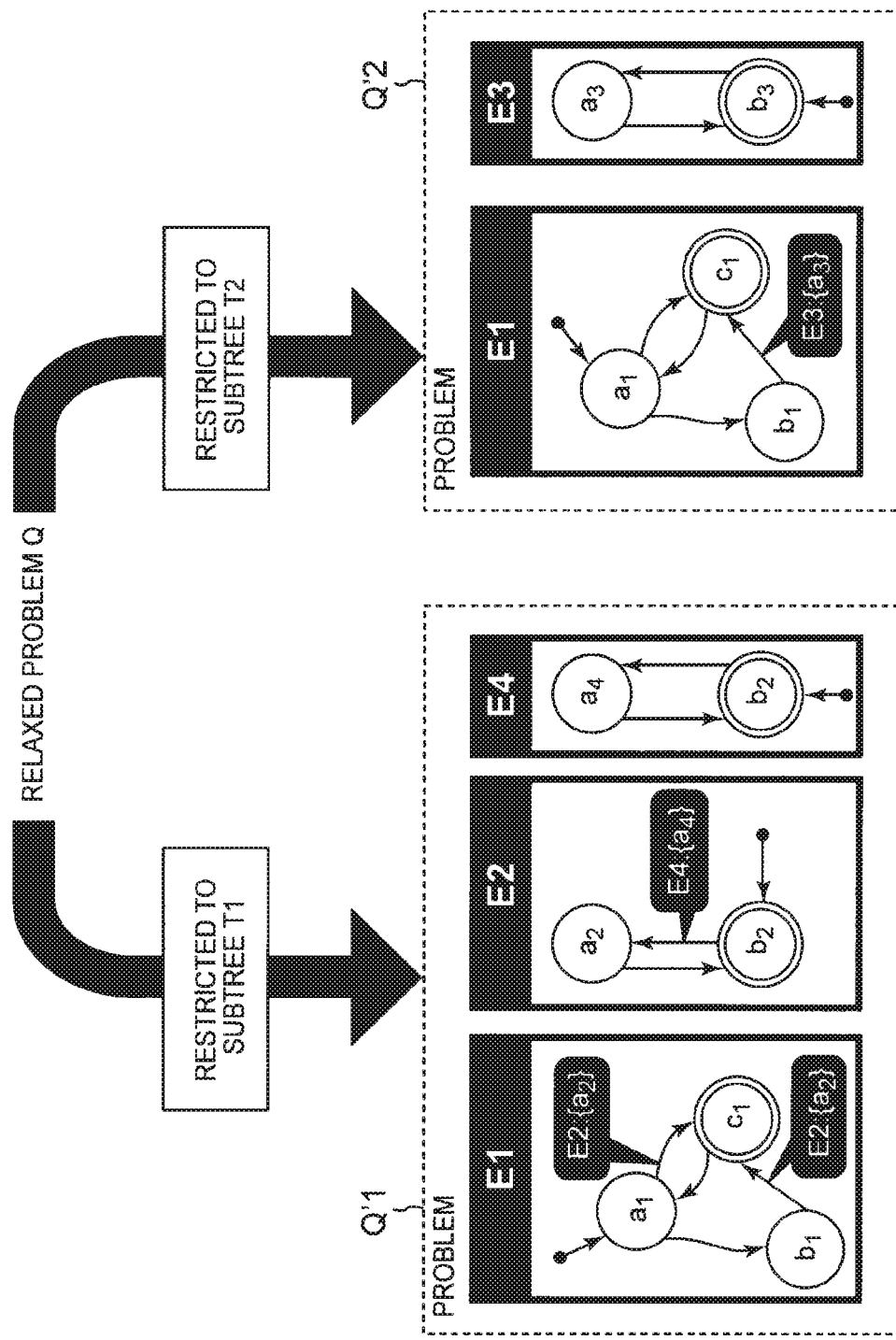
FIG. 23 is an explanatory diagram showing an example of problem Q' generated by the solving unit 122.

FIG. 23 is an explanatory diagram showing an example of the problem Q' generated by the solving unit 122. FIG. 23 shows a problem restricted by the use of subtrees in a stage of the transition array length calculating process performed by the solving unit 122.

A problem Q'1 showed in FIG. 23 is a problem in which the state element model indicated by the relaxed problem Q is restricted to the subtree T1. The state element model indicated by the problem Q'1 includes the state elements E1, E2, and E4 alone.

A problem Q'2 showed in FIG. 23 is a problem in which the state element model indicated by the relaxed problem Q is restricted to the subtree T2. The state element model indicated by the problem Q'2 includes the state elements E1 and E3 alone. The state element models respectively indicated by the problem Q'1 and the problem Q' 2 both include the state element E1, which is the state element $Q, in addition to elements of the subtrees.

Next, the solving unit 122 obtains solutions to the problems Q'1 and Q'2 (step S344). In step S344, the solving unit 122 elicits shortest paths on the respective state element models indicated by the defined problems Q'1 and Q'2 that are provided by defining the subtrees. The problems are solved by the transition array length calculating process internally and recursively performed by the solving unit 122.

Figure 24:
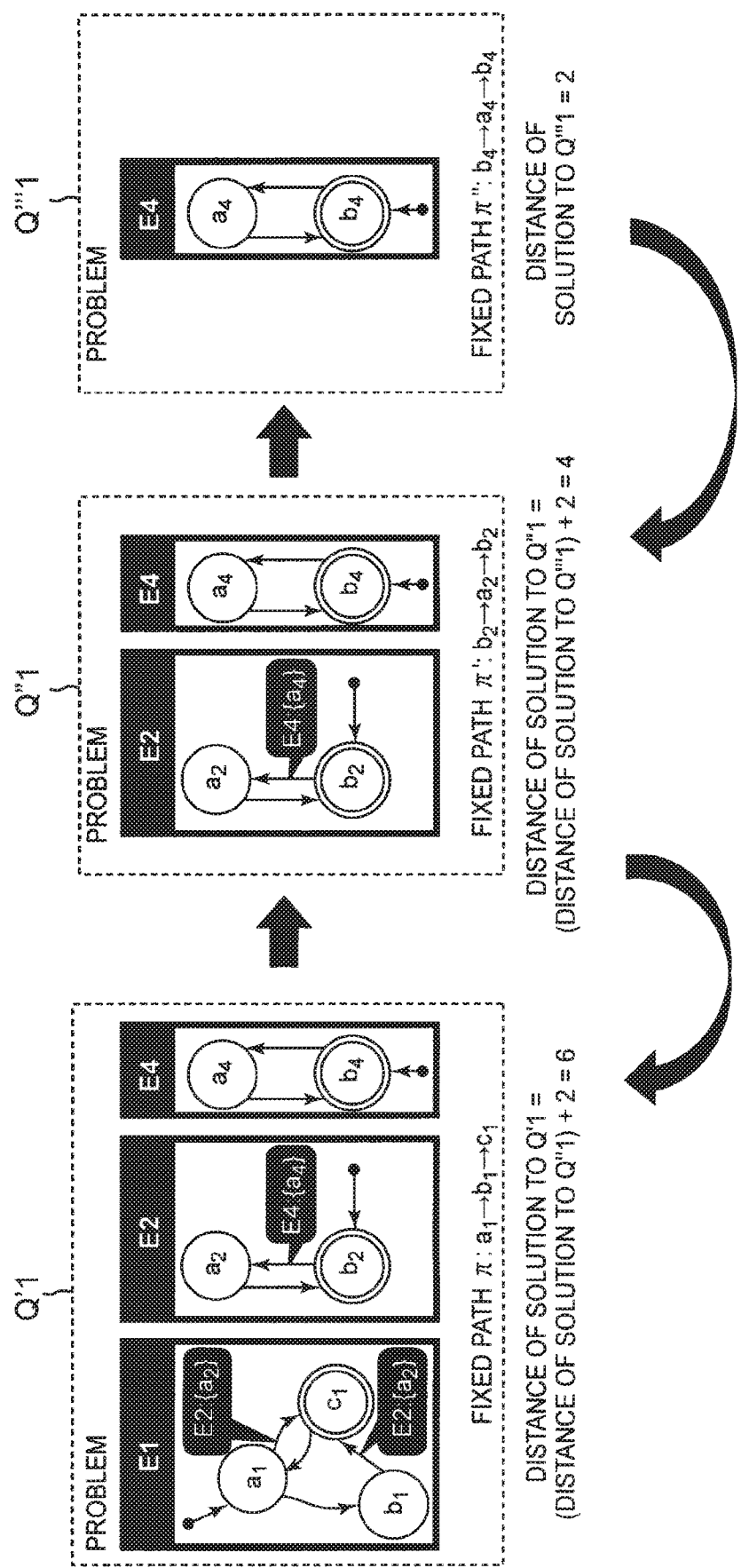
FIG. 24 is an explanatory diagram showing an example of how the problem Q' is solved by the solving unit 122.

An example of how the problem Q'1 is solvable by the solving unit 122 according to this method is hereinafter described. FIG. 24 is an explanatory diagram showing an example of how the problem Q' is solved by the solving unit 122. FIG. 24 shows a process to solve a problem restricted by the use of subtrees in a stage of the transition array length calculating process performed by the solving unit 122. In the example showed in FIG. 24, the solving unit 122 recursively uses the transition array length calculating process internally so as to calculate the distance of the solution to the problem Q' 1.

As for the problem Q'1, state transition of the state element E1 along the fixed path π requires state transition of the state element E2 to $a_2$. The solving unit 122 accordingly lists up non-redundant paths that may allow transitions of the state element E2 to $a_2$ and then to the target state $b_2$.

The solving unit 122 presents π'="$b_2 \to a_2 \to b_2$" showed in FIG. 24 as the only path meeting the requirement. Therefore, the distance of the solution to the problem Q'1 to be determined is a value obtained by adding the π length "2" to the distance of the solution to a problem Q"1 in which the problem Q'1 is restricted to the state elements E2 and E4 and state transition of the state element E2 is fixed to a path π' and executed.

The solution to the problem Q"1 is obtainable in a similar manner. The distance of the solution to the problem Q"1 is a value obtained by adding the π' length "2" to the distance of the solution to a problem Q'''1 in which the problem Q"1 is restricted to the state element E4 alone and state transition of the state element E4 is fixed to a path π "="$b_4 \to a_4 \to b_4$" and executed.

Because of no dependency being included in the problem Q'''1, the solving unit 122 may immediately determine that the distance of the solution to the problem Q'''1 is equal to the π' length "2". Thus, the solving unit 122 may recursively calculate the distance of the solution to the original problem Q'1 as "2+2+2=6".

By thus subdividing the problem into problems including no dependency at all, the solving unit 122 may obtain the transition array length using the transition array length calculating process of step S344.

The above-described method that is employed by the solving unit 122 to recursively use the transition array length calculating process is one method that can be employed by the solving unit 122 to obtain, in step S344, the transition array length indicative of the shortest path. The solving unit 122 according to this exemplary embodiment may employ any suitable method, instead of the method described above, to obtain the transition array length indicative of the shortest path.

In a similar manner, the solving unit 122 calculates and obtains "4" as the distance of the solution to the problem Q'2. After the distances of the solutions to the problems Q'1 and Q'2 are obtained, the solving unit 122 adds, to SCORE [π] (initial value is the π length "2"), values obtained by subtracting the path π length "2" from the respective distances (step S345).

After the distances of the solutions to the problems Q'1 and Q'2 are obtained, the solving unit 122 enters the second transition array length calculating loop (steps S346 and S347). In the state element model indicated by the relaxed problem Q, the state element E5 alone is not included in the dependency tree T (E1).

Therefore, the solving unit 122 obtains the transition array length "F" indicative of the shortest path for transition of the state element E5 from the current state to the target state (step S348). Next, the solving unit 122 adds the obtained transition array length to SCORE[π] (step S349).

After the transition array length is added, the solving unit 122 exits the second transition array length calculating loop (step S350). Then, the solving unit 122 outputs SCORE[π]=2+4+2+1=9 as the distance of the solution to the relaxed problem Q when state transition of the state element E1 showed in FIG. 20 is fixed to the path π, and then ends the transition array length calculating process.

Description of Effect

The constraint relaxing unit 111 according to this exemplary embodiment generates the relaxed problem on which more dependencies are reflected than the relaxed problem generated by the constraint relaxing unit 101 according to the first exemplary embodiment. The estimated distance calculator 120 according to this exemplary embodiment, therefore, may more accurately calculate the estimated distance than the estimated distance calculator 100 according to the first exemplary embodiment.

Because more dependencies are reflected on the relaxed problem according to this exemplary embodiment, the resulting relaxed problem may be complicated relative to the relaxed problem generated in the first exemplary embodiment. The solving unit 122, however, further subdivides the relaxed problem generated by the use of the dependency tree, which may allow solving unit 122 to obtain the solution with less time than required to solve the original automated planning problem.

Fourth Exemplary Embodiment

Description of Structure

A fourth exemplary embodiment of the present invention is hereinafter described referring to the accompanying drawings. The fourth exemplary embodiment represents an exemplary embodiment to which the first, second, and third exemplary embodiments are applied.

Figure 25:
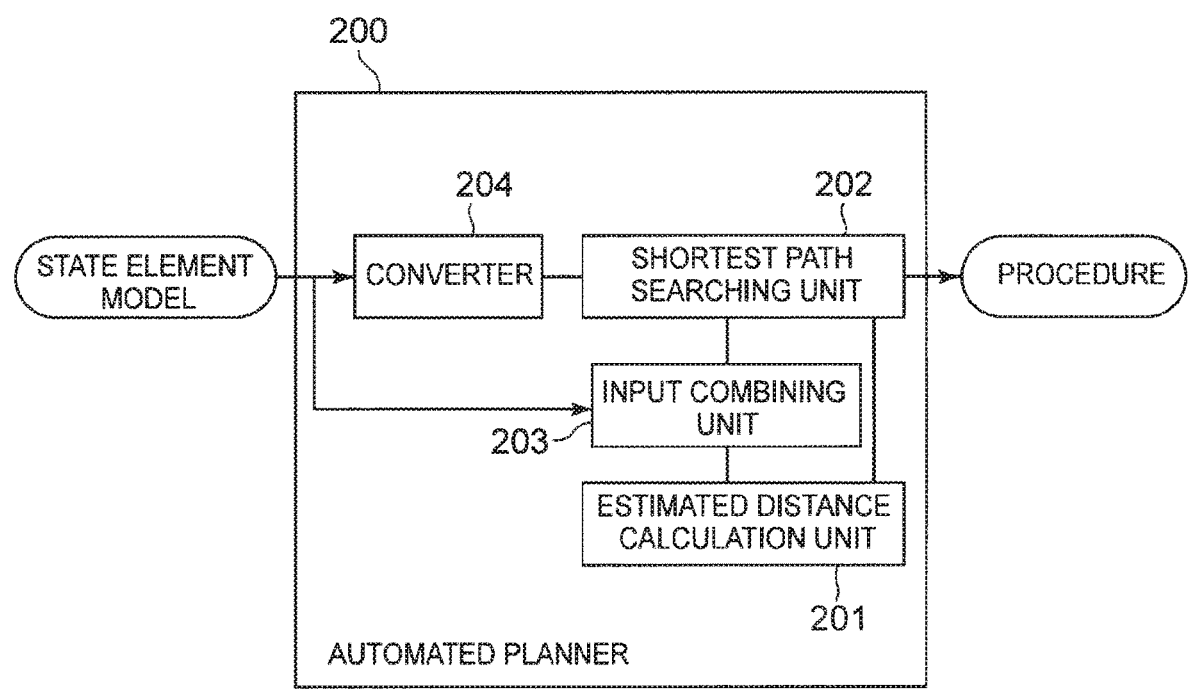
FIG. 25 is a block diagram showing a configuration example of a fourth exemplary embodiment of an automated planner 200 according to the present invention.

FIG. 25 is a block diagram showing a configuration example of a fourth exemplary embodiment of an automated planner 200 according to the present invention. As showed in FIG. 25, the automated planner 200 according to this exemplary embodiment has an estimated distance calculation unit 201, a shortest path searching unit 202, an input combining unit 203, and a converter 204.

The automated planner 200 according to this exemplary embodiment receives, as input, a state element model M, and then conducts the A* search so as to obtain the solution to an automated planning problem representing a shortest path on the state element model M. The automated planner 200 conducts the A* search in order to obtain a shortest path on a global state diagram on which the inputted state element model M is laid out.

The estimated distance calculation unit 201 is functionally and structurally similar to the estimated distance calculator 100 described in the first exemplary embodiment, the estimated distance calculator 110 described in the second exemplary embodiment, and the estimated distance calculator 120 described in the third exemplary embodiment.

The shortest path searching unit 202 has a function to search the shortest path on the state element model M. The shortest path searching unit 202 conducts the A* search to search the shortest path on the inputted global state diagram.

The A* search requires an estimated distance from the current state to the target state at an intermediate point during the ongoing search. When the estimated distance is requested, the shortest path searching unit 202 makes an inquiry with the estimated distance calculation unit 201 about the estimated distance through the input combining unit 203. The shortest path searching unit 202 uses, as the estimated distance, a value returned from the estimated distance calculation unit 201.

The input combining unit 203 has a function to combine global states and the state element model M. The input combining unit 203 inputs the global states and state element model M thus combined to the estimated distance calculation unit 201.

For example, the state element model M and global states G which are conversion results of the state element model M are inputted to the input combining unit 203. The input combining unit 203 generates a state element model M' in which the initial state of the state element model M has been reset to the global state G, and outputs the generated state element model M'.

Each global state retains three values; "search-completed" flag, shortest distance, and score. In the global initial state, the "search-completed" flag is set, and "0" is set as values of the shortest distance, while no value is set as the score.

The converter 204 has a function to convert the inputted state element model M into a global state diagram. The converter 204 may, for example, convert the state element model M into the global state diagram in a manner similar to the method described in PTL 1.

Description of Operation

Figure 26:
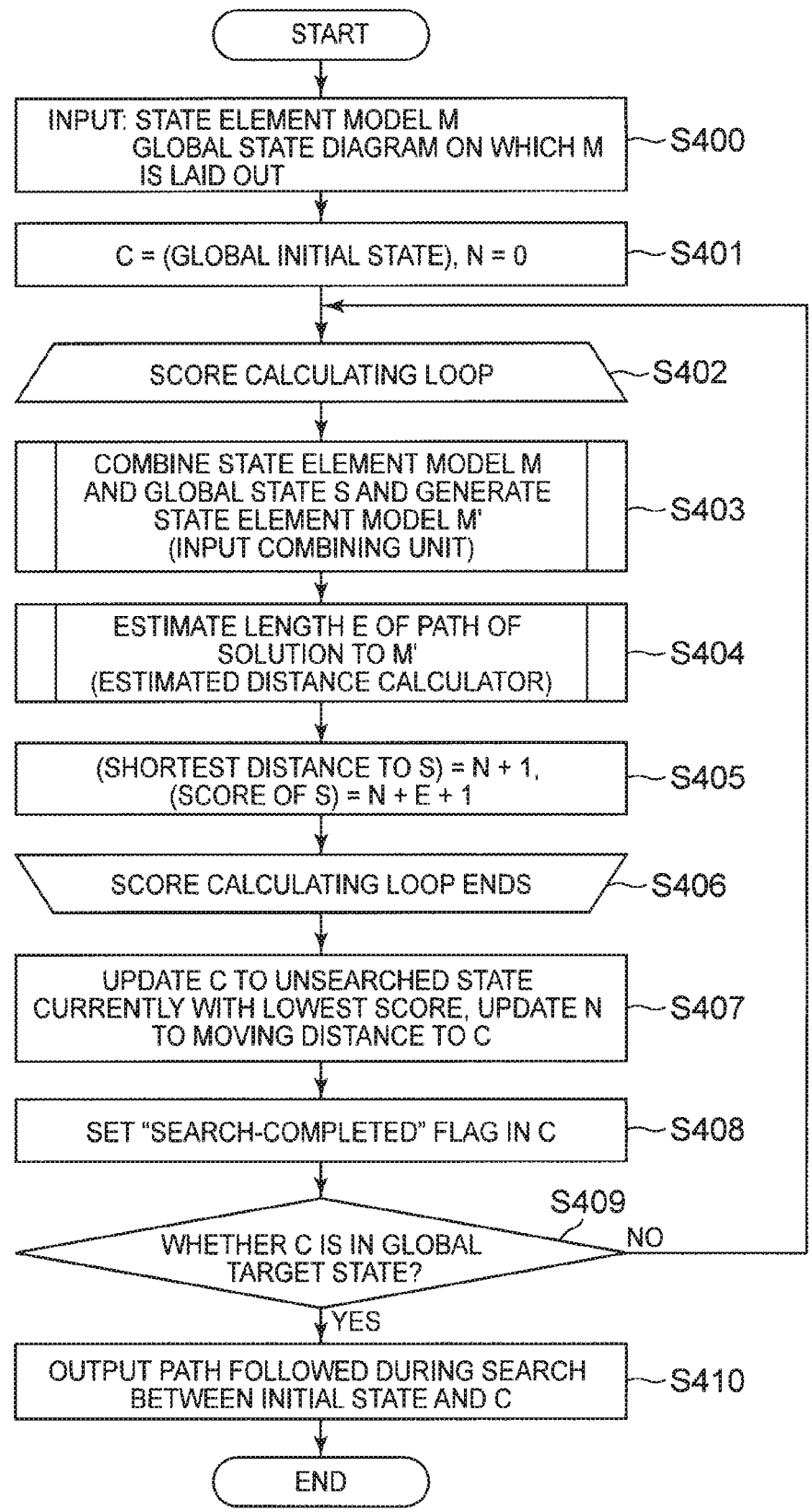
FIG. 26 is a flowchart showing an operation of a shortest path searching process performed by a shortest path searching unit 202.

The shortest path searching process performed by the shortest path searching unit 202 according to this exemplary embodiment is hereinafter described. FIG. 26 is a flowchart showing an operation of the shortest path searching process performed by the shortest path searching unit 202.

First, the state element model M and the global state diagram on which the state element model M is laid out are inputted to the shortest path searching unit 202 (step S400). Then, the shortest path searching unit 202 performs initial setting; set a current state C as the global initial state and 0 as the number of movements N (step S401). The shortest path searching unit 202 proceed with the search, retaining one current state C and the number of movements N.

Then, the shortest path searching unit 202 retrieves, out of global states allowed to transit from the current state C, any global state S whose score is yet to be calculated. This means that the operation enters a score calculating loop (step S402).

After the global state S is retrieved, the input combining unit 203 combines the global state S with the state element model M indicated by the original automated planning problem so as to generate a state element model M' (step S403). The input combining unit 203 inputs the generated state element model M' to the estimated distance calculation unit 201.

The estimated distance calculation unit 201 calculates an estimated distance E from the global state S to a global target state (step S404). Then, the shortest path searching unit 202 sets N+E+1 as the score of the global state S and sets N+1 as the shortest distance to the global state S (step S405).

The shortest path searching unit 202 repeatedly performs steps S403 to S405 for any global state S whose score is yet to be calculated among the global states allowed to transit from the current state C. Steps S403 to S405 are repeatedly performed for each and all of the score-uncalculated global states S among the global states to which transition from the current state C is possible.

After the scores of all of the global states S allowed to transit from the current state C are calculated, the shortest path searching unit 202 exits the score calculating loop (step S406).

Next, the shortest path searching unit 202 updates, among the score-calculated global states yet to be searched, the global state with a lowest score to a new current state C. The shortest path searching unit 202 further updates the number of movements N to a moving distance to the new current state C (step S407).

In case there is no global state selectable as the current state C in step S407, the shortest path searching unit 202 ends the shortest path searching process. The shortest path searching unit 202 also sets the "search-completed" flag in the new current state C (step S408).

Next, the shortest path searching unit 202 determines whether the current state C is the global target state (step S409). When the current state C is not the global target state (No in step S409), the shortest path searching unit 202 executes step S402 again.

When the current state C is the global target state (Yes in step S409), the shortest path searching unit 202 outputs, as the shortest path, a path followed for the global initial state to arrive at the current state C (step S410). After the path is outputted, the shortest path searching unit 202 ends the shortest path searching process.

It is a known matter that the algorithm showed in FIG. 26 allows the shortest path to be correctly obtained when a heuristic function used for the search has consistency. The estimated distance calculation unit 201 according to this exemplary embodiment functions as a heuristic function having consistency. The shortest path searching unit 202, by executing the process described earlier, returns the shortest path from the global initial state to the global target state.

Figure 27:
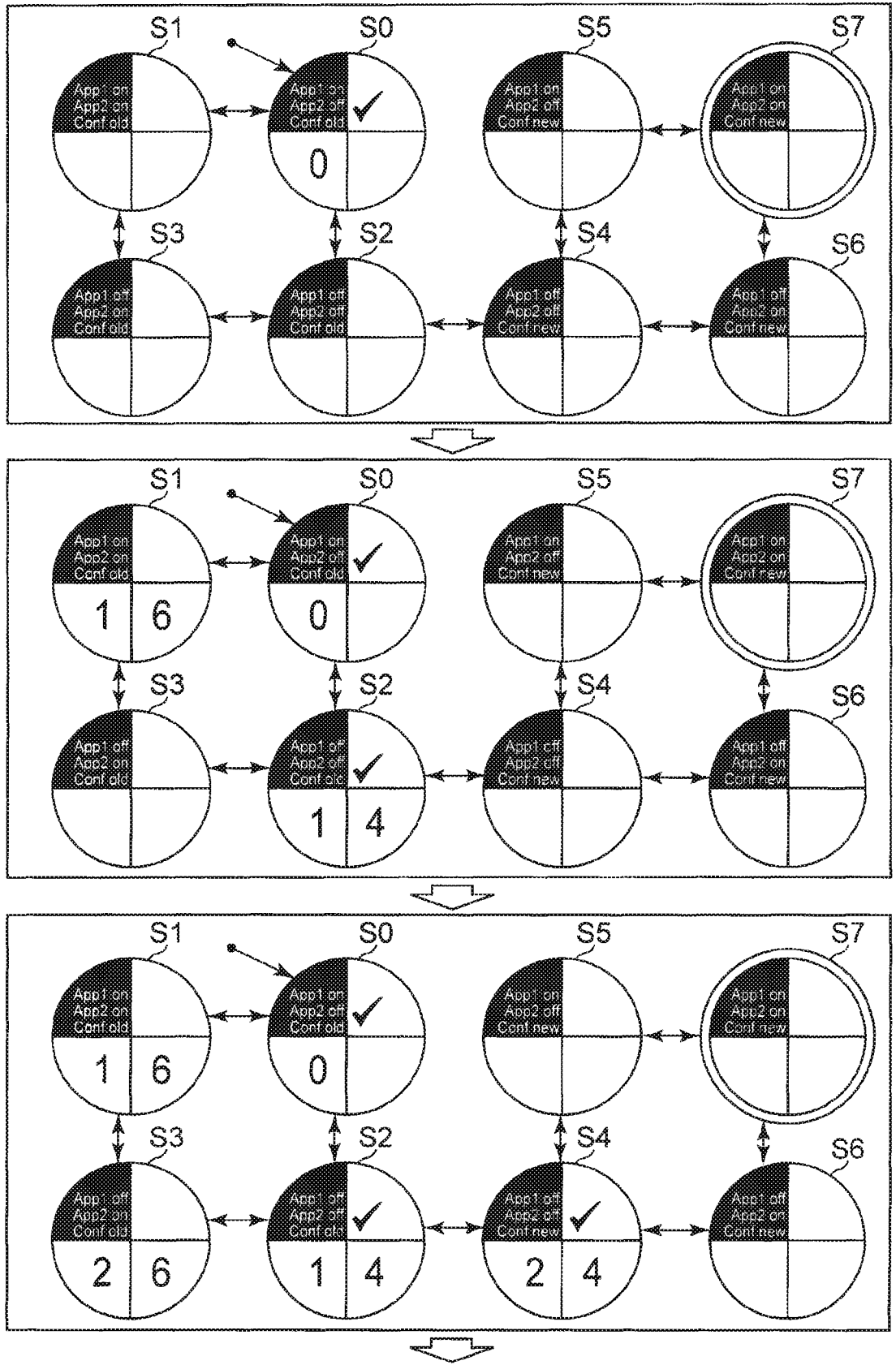
FIG. 27 is an explanatory diagram showing a specific example of the shortest path searching process performed by the shortest path searching unit 202.

The shortest path searching process performed by the shortest path searching unit 202 is hereinafter described referring to FIGS. 27 and 28. FIGS. 27 and 28 are explanatory diagrams showing specific examples of the shortest path searching process performed by the shortest path searching unit 202.

FIGS. 27 and 28 show a process to search the shortest path on the global state diagram. Rectangles of FIG. 27 and rectangles of FIG. 28 each show the global state diagram in a stage of the shortest path searching process. The state diagram during the shortest path searching process changes in the order of the upper rectangle of FIG. 27, the center rectangle of FIG. 27, the lower rectangle of FIG. 27, the upper rectangle of FIG. 28, and the lower rectangle of FIG. 28.

Circles showed in FIGS. 27 and 28 each represent a global state. Specifically, FIGS. 27 and 28 are drawings of global states S0 to S7. The global state S0 is the initial state, and the global state S7 is the target state.

Figure 29:
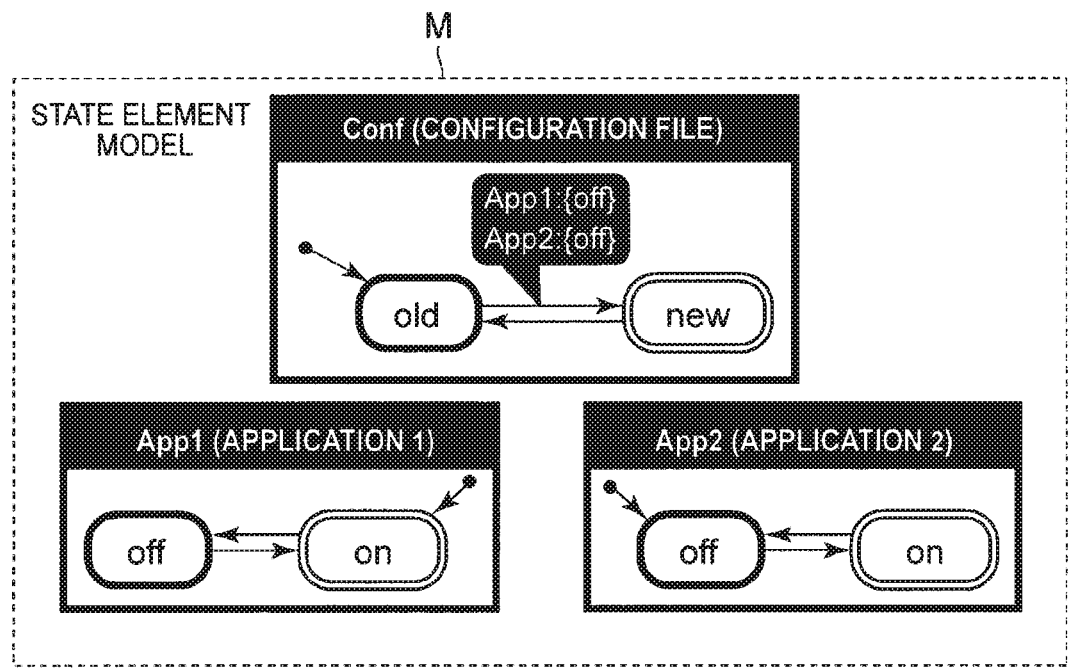
FIG. 29 is an explanatory diagram showing another example of a state element model.
Figure 40:
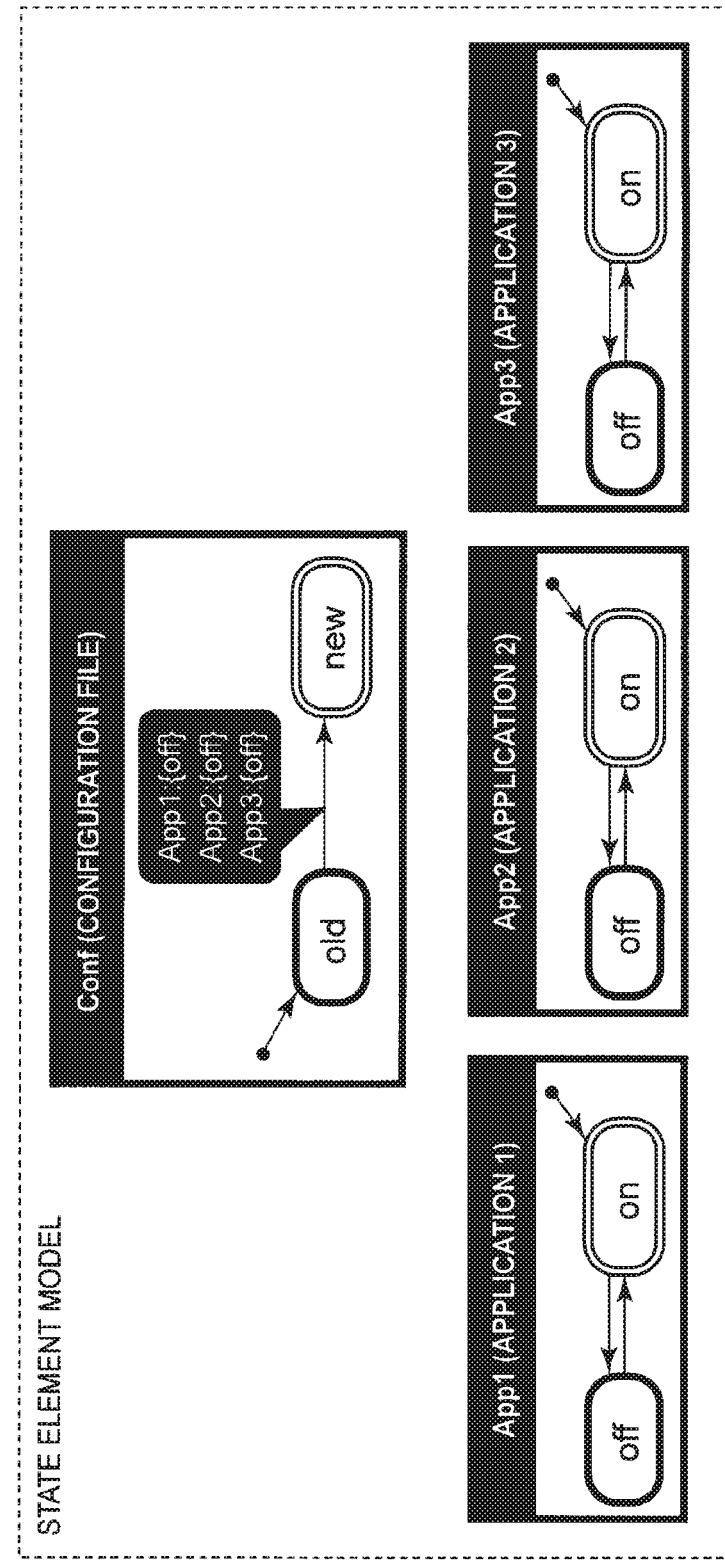
FIG. 40 is an explanatory diagram showing another example of a state element model.

FIG. 29 is a drawing of the state element model M which is the origin of the global state diagrams showed in FIGS. 27 and 28. FIG. 29 is an explanatory diagram showing another example of the state element model. The meanings of the notations showed in FIG. 29 are the same as those showed in FIG. 40. In the shortest path searching process showed in FIGS. 27 and 28, the state element model M showed in FIG. 29 is inputted to the shortest path searching unit 202.

The state element model M showed in FIG. 29 represents a task in which a status of one application being operated to read a predetermined configuration file is changed to a status of two applications being operated to read an updated configuration file. The task showed in FIG. 29 takes a scale-out approach of the applications.

Since three state elements are included in the state element model, the global state is expressed by combined states of the three state elements. The global state including states of a state element "Conf", a state element "App1", and a state element "App2" is expressed by [Conf:(Conf state), App1:(App1 state), App2:(App2 state)].

For example, the global initial state S0 is expressed by S0=[Conf:old, App1:on, App2:off], as showed in FIGS. 27 and 28. The combination of states representing a global state is described in a black part of the circle.

The "search-completed" flag, shortest distance, and score retained by the global state are described in each of the global states showed in FIGS. 27 and 28 in addition to the combination of states representing the global state. The "search-completed" flag is described in the upper right of each circle, the shortest distance is described in the lower left of each circle, and the score is described in the lower right of each circle. Any blank space indicates that a value to be described in the space is yet to be set or calculated.

The shortest path searching process performed by the shortest path searching unit 202 is hereinafter described referring to the flowchart of FIG. 26. First, the shortest path searching unit 202 calculates and obtains the estimated distance to the target state for each of two global states allowed to transit from the global initial state S0; global state 51 (51=[Conf:old, App1:on, App2:on]), and global state S2 (S2=[Conf:old, App1:off, App2:off]).

Figure 30:
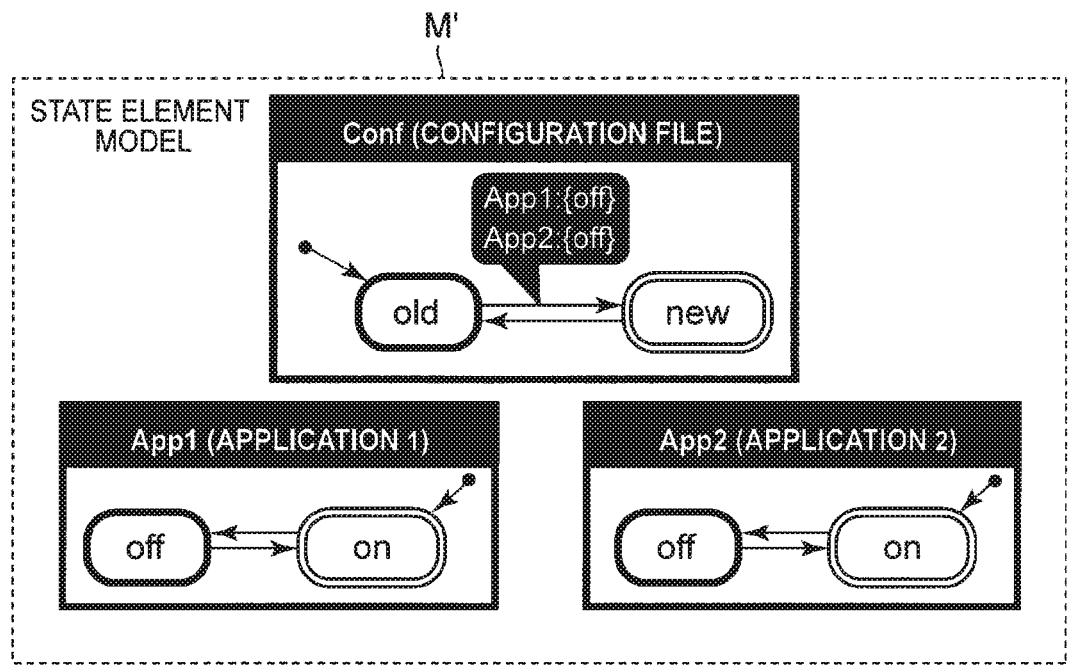
FIG. 30 is an explanatory diagram showing another example of a state element model.

After the global state 51 and the state element model M are inputted to the input combining unit 203, the input combining unit 203 generates a state transition model M' showed in FIG. 30 (step S403). FIG. 30 is an explanatory diagram showing another example of the state element model. The input combining unit 203 inputs the generated state element model M' to the estimated distance calculation unit 201.

The estimated distance calculation unit 201 obtains the estimated distance "5" on the basis of the generated state element model M' (step S404). By summing this estimated distance and the moving distance, the score of the global state S1 is "6". Similarly, the score of the global state S2 is "4" (step S405).

After the scores are thus calculated for all of the global states allowed to transit from the current state C (step S406), the shortest path searching unit 202 updates the current state C to the global state S2 which is an unsearched state with a lowest score (step S407).

The shortest path searching unit 202 sets the "search-completed" flag in the global state S2 (step S408). The center rectangle of FIG. 27 shows a global state diagram updated by setting in this diagram shortest distances and scores of the global states S1 and S2 and the "search-completed" flag of the global state S2.

Similarly, the shortest path searching unit 202 executes steps S403 to S405 again for the unsearched states allowed to transit from the global state S2, and then executes steps S407 and S408 of updating the current state C to a global state with a lowest score.

The shortest path searching unit 202 repeatedly executes the process showed in FIG. 26 until the current state C is updated to the global target state S7 (S7=[Conf:new, App1:on, App2:on]). The lower rectangle of FIG. 28 shows a global state diagram after the current state C is updated to the global target state S7.

The shortest path finally obtained is a path for transition of the global state in the global state diagram in the order of [Conf:old, App1:on, App2:off] →[Conf:old, App1:off App2:off]→[Conf:new, App1:off, App2:off]→[Conf:new, App1:on, App2:off]→[Conf:new, App1:on, App2:on]. This is a transition path of S0→S2→S4→S5→S7.

When transition of the state element E from the state s1 to the state s2 is described as "E:s1→s2", the solution to the automated planning problem showed in FIG. 29 is found to be a procedure, "App1:on→off, Conf:old→new, App1:off→on, App2:off→on", based on the before-mentioned path.

Description of Effect

The automated planner 200 according to this exemplary embodiment may enable a more accelerated search of a shortest path by using the estimated distance calculation unit 201 that functions as a heuristic function suitable for the state element model. The automated planner 200 according to this exemplary embodiment may provide a suitable method for finding the solution to an automated planning problem seeking a shortest path on a state element model.

Figure 31:
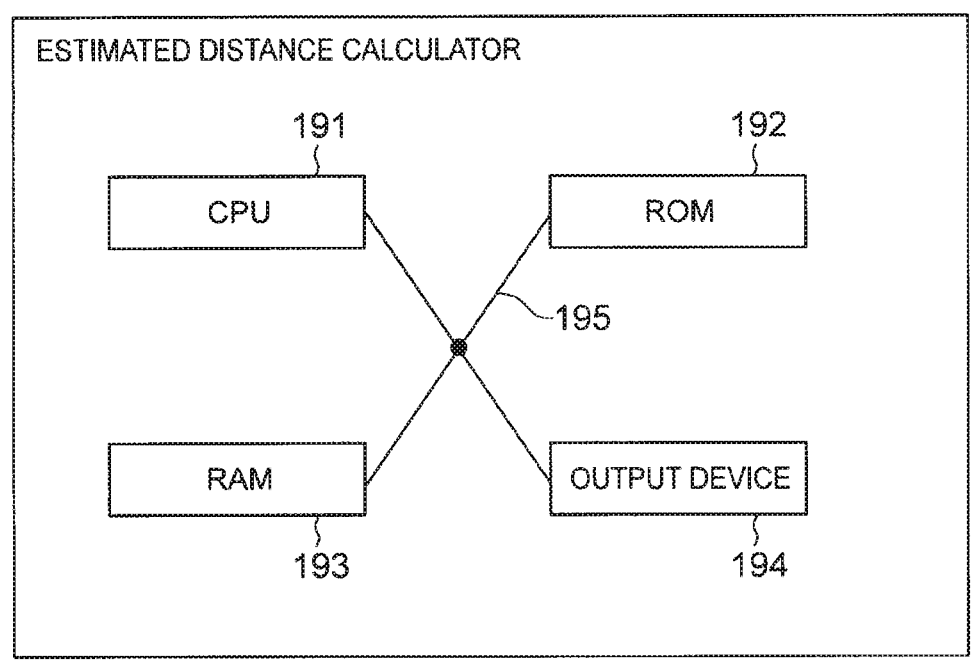
FIG. 31 is an explanatory diagram showing an example of a hardware configuration of the estimated distance calculator according to the present invention.

Hereinafter, a specific example of hardware configuration of the estimated distance calculators according to the exemplary embodiments. FIG. 31 is an explanatory diagram showing an example of a hardware configuration of the estimated distance calculator according to the present invention. FIG. 31 is a drawing of a hardware configuration that allows a computer to functionally operate the estimated distance calculators according to the exemplary embodiments.

As showed in FIG. 31, the estimated distance calculator has a CPU (Central Processing Unit) 191, a ROM (Read Only Memory) 192, a RAM (Random Access Memory) 193, and an output device 194. These structural elements are interconnected with a data bus 195 to allow them to transmit and receive data to and from one another. An example of the output device 194 is a display device.

The estimated distance calculators described in the exemplary embodiments may be operated by the CPU 191 executing processes by running programs stored in the ROM 192. The constraint relaxing units 101 and 111, solving units 102, 112, and 122 may be functional elements operated under programmed control by the CPU 191 executing processes.

Optionally, the structural units provided in the estimated distance calculators according to the exemplary embodiments may be respectively configured as hardware circuits. For example, the constraint relaxing units 101 and 111, solving units 102, 112, and 122 may be each configured as LSI (Large Scale Integration). The constraint relaxing unit and the solving unit may be collectively configured as one LSI.

The automated planner 200 according to the fourth exemplary embodiment may include hardware components configured as showed in FIG. 31.

Figure 32:
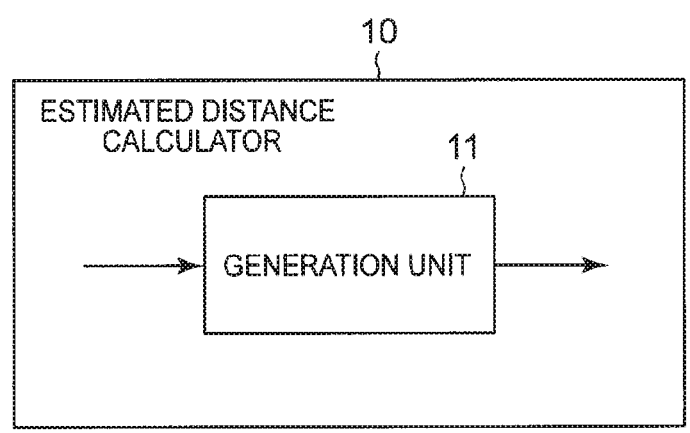
FIG. 32 is a block diagram schematically showing the estimated distance calculator according to the present invention.

Next, the summary of the present invention is described. FIG. 32 is a block diagram schematically showing the estimated distance calculator according to the present invention. An estimated distance calculator 10 according to the present invention generates, on the basis of a first state element model comprising multiple state elements, a second state element model which is another state element model, wherein the state elements include multiple states and state transitions assigned with transition conditions between the multiple states. The estimated distance calculator 10 has a generation unit 11 (for example, constraint relaxing unit 101) which generates the second state element model in such a manner as to comprise any one state element among the multiple state elements and state elements other than the one state element which are selected from among the multiple state elements after transition conditions satisfying predetermined condition are removed.

The estimated distance calculator thus characterized may enable a high-speed search of a shortest path on the state element model.

The estimated distance calculator 10 may further include an elicitation unit (for example, solving unit 102) which receives, as input, the second state element model generated and elicits, on the basis of a current state and a target state included in the second state element model, a smallest number of transitions for the current state to arrive at the target state.

Of all of the state transitions included in the second state element model, there may be a limited number of state transitions that can be used.

The estimated distance calculator thus further characterized may successfully solve a relaxed problem.

The transition condition satisfying the predetermined condition may be all of transition conditions.

The estimated distance calculator thus further characterized may generate a most simplified relaxed problem.

The transition condition satisfying the predetermined condition may be any transition condition but a transition condition having a relationship with a transition condition included in any one state element among the multiple state elements.

The state element model and one of the plurality of state elements may be inputted to the generation unit 11, and the generation unit 11 may generate a dependency tree whose root is one state element. Specifically, the dependency tree includes nodes including part or all of the plurality of state elements, one or more directional branches representing a relationship that the dependency destination of a condition for transition included in one of two of the nodes is the other one of the two nodes, and a root included in one of the nodes. The generation unit 11 may generate a second state element model including one of the plurality of state elements, and a state element from which any condition for transition but a condition for transition along the directional branches of the dependency tree whose root is one of the plurality of state elements. The condition for transition includes a dependency destination including a title indicating part or all of a plurality of states.

The estimated distance calculator thus further characterized may solve a relaxed problem using such a dependency tree.

The elicitation unit may generate a third state element model which is a state element model comprising a state element assigned with transition conditions and a state element from which transition conditions has been removed, the state elements being included in the second state element model inputted, and then elicit a smallest number of transitions using the third state element model generated.

The elicitation unit may generate a problem in which a restriction is imposed on a state transition usable in a relaxed problem expressed by the inputted second state element model, generate a third state element model on the basis of a state element model that expresses the generated problem, and sum solutions to problems expressed by the third state element model to elicit a smallest number of transitions.

The estimated distance calculator thus further characterized may solve at high speed any relaxed problem including abundant state elements.

The elicitation unit may generate a third state element model which is a state element model comprising a group of relevant state elements among multiple state elements included in the second state element model inputted, and elicit a smallest number of transitions using the third state element model generated.

The elicitation unit may receive, as input, the dependency tree used to generate the second state element model and generates a plurality of dependency trees whose roots are nodes at which the roots of the inputted dependency tree arrive through one directional branch and whose noses are part of state elements included in the dependency tree. The elicitation unit may further generate a third state element model including one or more of state element included in one of the plurality of dependency trees among a plurality of state elements included in the inputted second state element model and elicit a smallest number of transitions using the generated third state element model.

The estimated distance calculator thus further characterized may solve a relaxed problem including abundant state elements at high speed using subtrees.

The generation unit 11 may generate all of the second state element models generatable based on the first state element model. The elicitation unit may receive, as input, the all of the second state element models generated and elicit a smallest number of transitions on the basis of and for each of the all of the second state element models inputted, and output a largest number of transitions among the elicited smallest numbers of transitions.

This may allow the estimated distance calculator to calculate an estimated distance including, as additional factor, dependency in a state element most affected by dependency between the state elements. The reason for that is, more constraints may be imposed on the relaxed problem as the state elements are more affected by dependency, which may lead to longer distance of a solution to the relaxed problem.

The estimated distance calculator 10 may include a searching unit (for example, shortest path searching unit 202) that searches, using the largest number of transitions outputted by the elicitation unit as the estimated distance to the target state, a shortest path which is the solution to the automated planning problem expressed by the first state element model.

This may allow the estimated distance calculator to solve the automated planning problem at high speed.

The elicitation unit may elicit a smallest number of transitions through the breadth first search.

The estimated distance calculator thus further characterized may solve the automated planning problem at high speed using the breadth first search.

The elicitation unit may repeatedly apply a transition array length calculating process to the third state element model so as to elicit a smallest number of transitions.

The estimated distance calculator thus further characterized may solve a relaxed problem including abundant dependencies at high speed.

Figure 33:
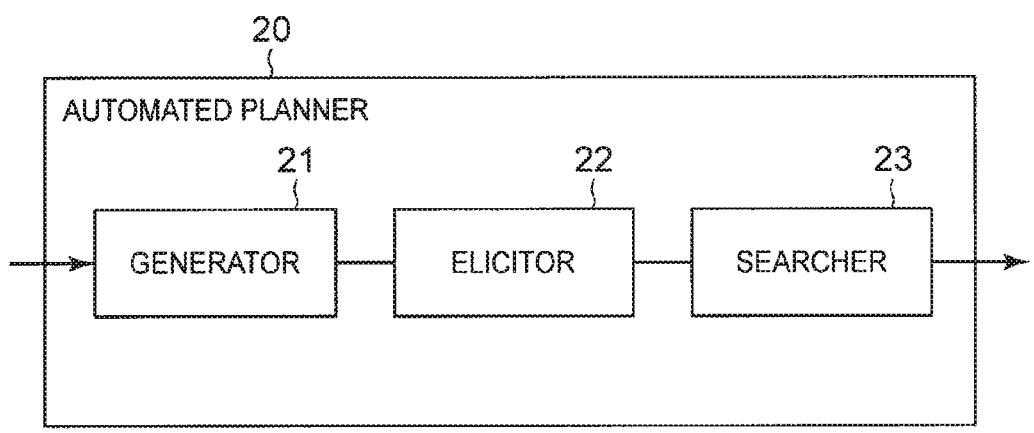
FIG. 33 is a block diagram schematically showing the automated planner according to the present invention.
Figure 35:
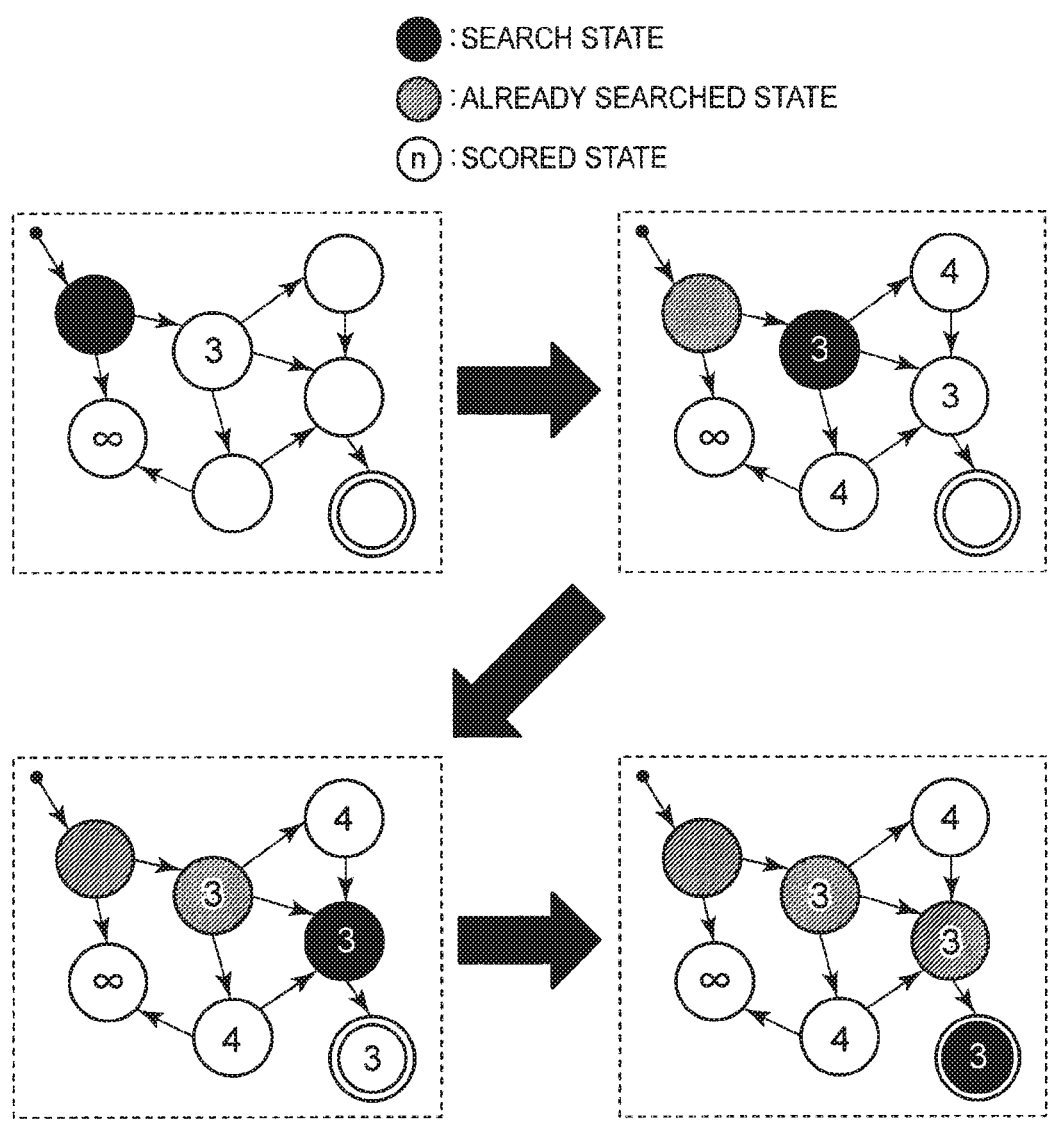
FIG. 35 is an explanatory diagram showing a specific example of the A* search of a shortest path.
Figure 36:
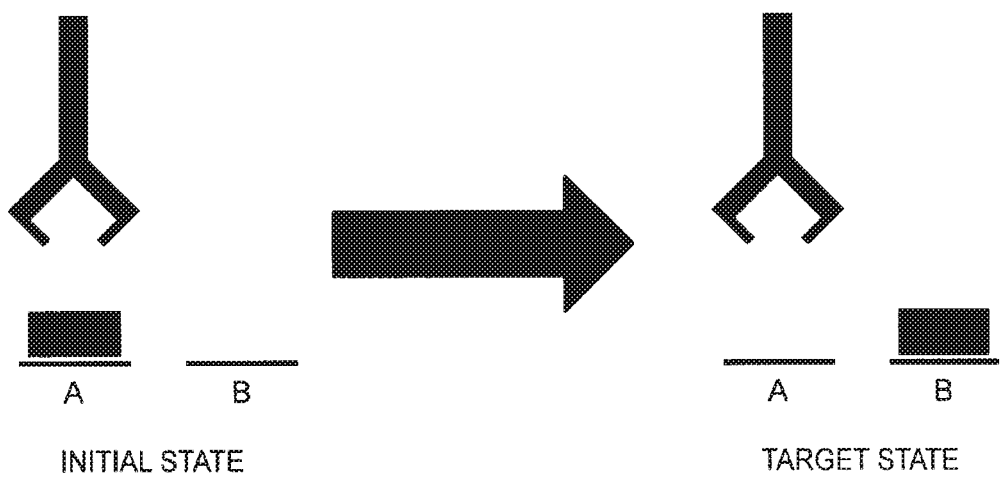
FIG. 36 is an explanatory diagram showing initial states and target states of a crane and a load.
Figure 37:
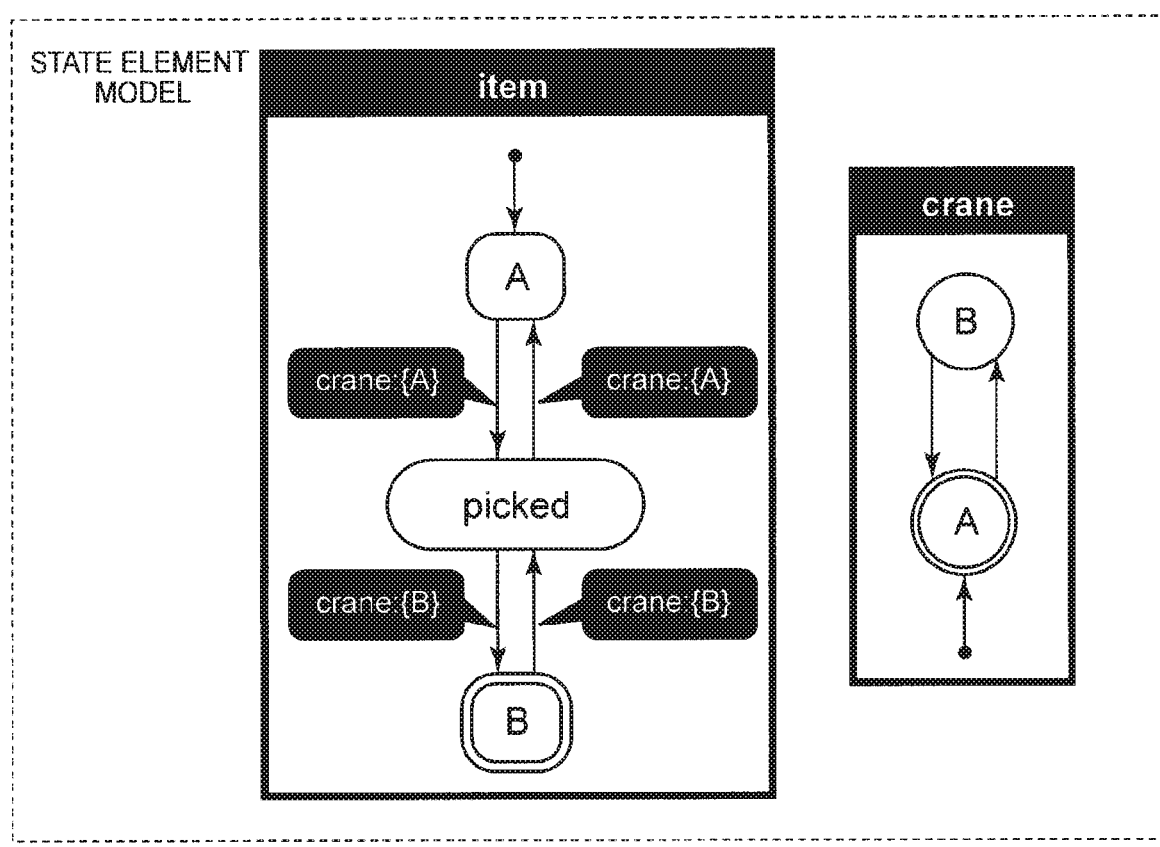
FIG. 37 is an explanatory diagram showing an example of a state element model.

FIG. 33 is a block diagram schematically showing the automated planner according to the present invention. An automated planner 20 according to the present invention generates, on the basis of a first state element model comprising multiple state elements, a second state element model which is another state element model, wherein the state elements include multiple states and state transitions assigned with transition conditions between the multiple states. The automated planner 20 has a generator 21 (for example, estimated distance calculation unit 201), an elicitor 22 (for example, estimated distance calculation unit 201), and a searcher 23 (shortest path searching unit 202). The generator 21 generates the second state element model in such a manner as to comprise any one state element among the multiple state elements and state elements other than the one state element which are selected from among the multiple state elements after transition conditions satisfying predetermined condition are removed. The elicitor 22 receives, as input, the second state element model and elicits, on the basis of a current state and a target state included in the second state element model, a smallest number of transitions for the current state to arrive at the target state. The searcher 23 searches, using the smallest number of transitions, a shortest path which is a solution to an automated planning problem expressed by the first state element model.

The automated planner thus characterized may enable a high-speed search of the shortest path on the state element model.

The transition condition satisfying the predetermined condition may be all of transition conditions.

The automated planner thus further characterized may generate a most simplified relaxed problem.

The transition condition satisfying the predetermined condition may be any transition condition but a transition condition having a relationship with a transition condition included in any one state element among the multiple state elements.

The automated planner thus further characterized may solve a relaxed problem using such a dependency tree.

The exemplary embodiments, in part or in whole, may be described as in the supplementary notes below, which, however, only represent some examples.

Supplementary Note 1

Provided is an automated planning method usable in an automated planner that generates, on the basis of a first state element model comprising multiple state elements, a second state element model which is another state element model, wherein the state elements include multiple states and state transitions assigned with transition conditions between the multiple states. The automated planning method includes: generating the second state element model in such a manner as to comprise any one state element among the multiple state elements and state elements other than the one state element which are selected from among the multiple state elements after transition conditions satisfying predetermined condition are removed; receiving, as input, the second state element model and eliciting, on the basis of a current state and a target state included in the second state element model, a smallest number of transitions for the current state to arrive at the target state; and searching, using the smallest number of transitions, a shortest path which is a solution to an automated planning problem expressed by the first state element model.

Supplementary Note 2

Provided is an automated planning program executable in a computer that generates, on the basis of a first state element model comprising multiple state elements, a second state element model which is another state element model, wherein the state elements include multiple states and state transitions assigned with transition conditions between the multiple states. The automated planning program prompts the computer to execute processing steps of: generating the second state element model in such a manner as to comprise any one state element among the multiple state elements and state elements other than the one state element which are selected from among the multiple state elements after transition conditions satisfying predetermined condition are removed; receiving, as input, the second state element model and eliciting, on the basis of a current state and a target state included in the second state element model, a smallest number of transitions for the current state to arrive at the target state; and searching, using the smallest number of transitions, a shortest path which is a solution to an automated planning problem expressed by the first state element model.

The present invention was thus far described referring to the exemplary embodiments and examples, however, are not necessarily limited to the above-described exemplary embodiments and examples. The technical aspects and details may include various modifications that can be grasped by those skilled in the art within the scope of matters described herein.

This application claims priority to Japanese Patent Application No. 2016-143311 filed on Jul. 21, 2016 and Japanese Patent Application No. 2016-223322 filed on Nov. 16, 2016, entire contents of which are incorporated herein by reference.

INDUSTRIAL APPLICABILITY

The automated planning technique may be effectively used to calculate future actions in advance using artificial intelligence and to plan procedures for executing the calculated actions. The present invention is directed to optimizing an automated planning problem that searches a shortest path on a state element model and may be useful in efforts to solve at high speed any automated planning problem associated with a system including a plurality of small-sized subsystems that interfere with other subsystems.

REFERENCE SIGNS LIST 10, 100, 110, 120 Estimated distance calculator
11 Generation unit
20 Automated planner
21 Generator
22 Elicitor
23 Searcher
101, 111 Constraint relaxing unit
102, 112, 122 Solving unit
191 CPU
192 ROM
193 RAM
194 Output device
195 Data path
200 Automated planner
201 Estimated distance calculation unit
202 Shortest path searching unit
203 Input combining unit
204 Converter

What is claimed is:

1. An apparatus comprising:
a memory storing one or more instructions; and
a processor configured to execute the one or more instructions to:
receive a first state element model comprising multiple state elements and a plurality of dependencies, the multiple state elements including multiple states and state transitions assigned with dependency between the multiple states;
generate a second state element model based on the first state element model corresponding to a first state element, among the multiple state elements in the first state element model, by including first dependencies, among the plurality of dependencies, and other state elements of which dependencies satisfying a predetermined condition are removed among the multiple state elements; and
determine a shortest path between a current state and a target state in the second state element model.

2. The apparatus according to claim 1, wherein the processor is configured to execute the one or more instructions to:
receive the second state element model generated; and
determine a smallest number of transitions from the current state to the target state.

3. The apparatus according to claim 2, wherein
the predetermined condition is all dependencies, among the plurality of dependencies.

4. The apparatus according to claim 2, wherein
the predetermined condition is any dependency, among the plurality of dependencies, having a relationship with a dependency included in the first state element.

5. The apparatus according to claim 3, wherein the processor is configured to execute the one or more instructions to:
generate a third state element model which is a state element model comprising a state element assigned with dependency and a state element from which dependency has been removed, the state elements being included in the second state element model, and
determine a smallest number of transitions using the third state element model generated.

6. The apparatus according to claim 4, wherein the processor is configured to execute the one or more instructions to:
generate a third state element model which is a state element model comprising a group of relevant state elements among multiple state elements included in the second state element model, and
elicits determine a smallest number of transitions using the third state element model generated.

7. The apparatus according to claim 2, wherein the processor is configured to execute the one or more instructions to:
generate all of the second state element models generatable based on the first state element model,
receive all of the generated second state element models,
determine a smallest number of transitions based on the second state element models for each of the second state element models, and
output a largest number of transitions among the determined smallest numbers of transitions.

8. A method comprising:
receiving a first state element model comprising multiple state elements and a plurality of dependencies, the multiple state elements including multiple states and state transitions assigned with transition conditions between the multiple states;
generating a second state element model based on the first state element model corresponding to a first state element, among the multiple state elements in the first state element model, by including first dependencies, among the plurality of dependencies, and other state elements of which dependencies satisfying a predetermined condition are removed among the multiple state elements; and
determining a shortest path between a current state and a target state in the second state element model.

9. A non-transitory computer-readable recording medium having recorded therein a program executable in a computer to perform a method comprising:
receiving a first state element model comprising multiple state elements and a plurality of dependencies, the multiple state elements including multiple states and state transitions assigned with transition conditions between the multiple states;
generating a second state element model based on the first state element model corresponding to a first state element, among the multiple state elements in the first state element model, by including first dependencies, among the plurality of dependencies, and other state elements of which dependencies satisfying a predetermined condition are removed among the multiple state elements; and
determining a shortest path between a current state and a target state in the second state element model.

10. An apparatus comprising:
a memory storing one or more instructions; and
a processor configured to execute the one or more instructions to:
receive a first state element model comprising multiple state elements and a plurality of dependencies, the multiple state elements including multiple states and state transitions assigned with transition conditions between the multiple states;
generate a second state element model based on the first state element model corresponding to a first state element, among the multiple state elements in the first state element model, by including first dependencies, among the plurality of dependencies, and other state elements of which dependencies satisfying a predetermined condition are removed among the multiple state elements;
determine a smallest number of transitions from a current state to a target state in the second state element model; and
determine, using the smallest number of transitions, a shortest path between the current state and the target state.

11. The apparatus according to claim 3, wherein the processor is configured to execute the one or more instructions to:
generate all of the second state element models generatable based on the first state element model,
receive all of the generated second state element models,
determine a smallest number of transitions based on the second state element models for each of the second state element models, and
output a largest number of transitions among the determined smallest numbers of transitions.

12. The apparatus according to claim 4, wherein the processor is configured to execute the one or more instructions to:
generate all of the second state element models generatable based on the first state element model,
receive all of the generated second state element models,
determine a smallest number of transitions based on the second state element models for each of the second state element models, and
output a largest number of transitions among the determined smallest numbers of transitions.

13. The apparatus according to claim 5, wherein the processor is configured to execute the one or more instructions to:
generate all of the second state element models generatable based on the first state element model,
receive all of the generated second state element models,
determine a smallest number of transitions based on the second state element models for each of the second state element models, and
output a largest number of transitions among the determined smallest numbers of transitions.

14. The apparatus according to claim 6, wherein the processor is configured to execute the one or more instructions to:
- generate all of the second state element models generatable based on the first state element model,
- receive all of the generated second state element models,
- determine a smallest number of transitions based on the second state element models for each of the second state element models, and
- output a largest number of transitions among the determined smallest numbers of transitions.

* * * * *